US008111131B2

(12) United States Patent
Zaveruha et al.

(10) Patent No.: US 8,111,131 B2
(45) Date of Patent: Feb. 7, 2012

(54) OCCUPANCY SENSORS PROGRAMMED TO DETERMINE LOSS OF LAMP LIFE AS LAMP IS USED

(75) Inventors: Ryan A. Zaveruha, Milford, CT (US);
Brian P. Platner, Lyme, CT (US);
Benjamin C. Hahn, Middletown, CT (US)

(73) Assignee: ABL IP Holding, LLC, Atlanta, GA (US)

( * ) Notice: Subject to any disclaimer, the term of this patent is extended or adjusted under 35 U.S.C. 154(b) by 777 days.

(21) Appl. No.: 12/192,520

(22) Filed: Aug. 15, 2008

(65) Prior Publication Data

US 2011/0025497 A1    Feb. 3, 2011

(51) Int. Cl.
*G05B 23/02*    (2006.01)
(52) U.S. Cl. ............... 340/3.1; 340/641; 340/541
(58) Field of Classification Search .............. 340/641, 340/541, 3.1, 556
See application file for complete search history.

(56) References Cited

U.S. PATENT DOCUMENTS

| | | | |
|---|---|---|---|
| 5,473,202 A | 12/1995 | Mudge et al. | |
| 5,640,143 A | 6/1997 | Myron et al. | |
| 5,699,243 A * | 12/1997 | Eckel et al. | 700/17 |
| 5,701,117 A | 12/1997 | Platner et al. | |
| 5,821,642 A | 10/1998 | Nishhira et al. | |
| 5,946,209 A * | 8/1999 | Eckel et al. | 700/14 |
| 5,986,357 A | 11/1999 | Myron et al. | |
| 6,078,253 A | 6/2000 | Fowler | |
| 6,151,529 A | 11/2000 | Batko | |
| 6,215,398 B1 | 4/2001 | Platner et al. | |
| 6,304,180 B1 | 10/2001 | Platner et al. | |
| 6,415,205 B1 | 7/2002 | Myron et al. | |
| 6,850,159 B1 | 2/2005 | Mudge | |
| 7,319,389 B1 | 1/2008 | Mudge | |

OTHER PUBLICATIONS

"LampMaximizer™ High Bay 360° Sensor," 2-page data sheet, Sensor Switch, Inc., Wallingford, Connecticut, revised Jul. 1, 2008.
"SmarT-Bay Energy-Efficient Highbay," 8-page brochure, Stonco and ExceLine, Union, New Jersey and www.smartlightingtechnology.com/pdf/SmarTBay_608.pdf, downloaded on or about Jul. 25, 2008.
"SmarT-Bay 6-Light T5HO," 5-page data sheet, Crescent Stonco, Union, New Jersey and www.smartlightingtechnology.com/pdf/spec_SBU_T5HO_6lt.pdf, downloaded on or about Jul. 25, 2008.

* cited by examiner

*Primary Examiner* — Travis Hunnings
(74) *Attorney, Agent, or Firm* — Byrne Poh LLP; Garry J. Tuma

(57) ABSTRACT

Programmable occupancy sensors that control the on/off operation of a fluorescent lamp automatically determine loss of lamp life as the lamp is used. The programmable occupancy sensors can provide lamp life status and can automatically alert a user when a lamp is nearing its end of life and should be replaced. The occupancy sensors are also programmable to automatically maximize lamp life and energy savings by selecting an optimal time delay from among a number of selectable time delays at which to operate the sensor. The selection is based on an occupancy pattern sensed by the sensor over a given period of time. The optimal time delay, which prevents the lamp from turning off immediately after last sensing occupancy, extends lamp life by limiting the number of lamp off/on transitions, which shortens lamp life, in view of overall energy usage and lamp usage.

112 Claims, 14 Drawing Sheets

LAMP LIFE STATUS

ZONE 1 • • • • 56% REMAINING

ZONE 2 • • • • 1% REMAINING
*REPLACE*

ZONE 3 • • • • 95% REMAINING

ZONE 4 • • • • 81% REMAINING

FIG. 14

OCCUPANCY SENSORS PROGRAMMED TO DETERMINE LOSS OF LAMP LIFE AS LAMP IS USED

FIELD OF THE INVENTION

The invention relates to occupancy sensors. More particularly, the invention relates to occupancy sensors programmed to automatically determine loss of lamp life as a fluorescent lamp controlled by the occupancy sensor is used.

BACKGROUND OF THE INVENTION

Lamps typically are replaced either according to a predetermined schedule or after they burn out. The pre-determined schedule is usually a rough estimate of when lamps will be near their end of life based on the lamp's published lamp life (defined in hours of operation) and the lamp's expected usage. Neither replacement method is particularly desirable. Replacing lamps according to a schedule may unnecessarily increase lamp replacement costs and environmental waste if the replaced lamps still have many hours of lamp life remaining. Replacing lamps after they burn out causes at least some inconvenience and may result in hazardous or dangerous conditions until the lamps are replaced. Unfortunately, nothing is currently known that can automatically alert a user to a lamp's pending end of life based on actual usage of the lamp.

Occupancy sensors automatically control the operation of lights and are used to save energy and lamp life by turning off lights in areas that are unoccupied. When the presence of one or more persons is detected by the occupancy sensor, the sensor turns on or keeps on the lights controlled by the sensor. However, the lamp life of a fluorescent lamp decreases as the number of starts (i.e., off/on transitions) increases. That is, each off/on transition reduces the lamp's operating hours by a small amount. Thus, if lights are turned off and then back on again after too short a period of off time, more lamp life is lost by the affect of the lights turning back on than is saved by the short off time.

To help prevent lights from unnecessarily turning off and on too frequently, occupancy sensors typically have a short time delay that keeps lights on after occupancy is last detected. Should an occupant return within the time delay, the lights will remain on, thus avoiding an off/on transition. However, this feature may not extend lamp life if the actual occupancy pattern does not conform to the time delay. For example, if occupants tend to leave and return just after expiration of the sensor's time delay, no off/on transitions are avoided and loss of lamp life is accelerated.

This time delay is programmable in some known occupancy sensors. However, nothing is currently known that can automatically select the optimal time delay based on actual occupancy patterns. Thus, a user is likely to select a time delay based on a predicted occupancy pattern, which may or may not result in any lamp life savings.

In view of the foregoing, it would be desirable to be able to provide an occupancy sensor that can be programmed to monitor and report lamp life status to a user.

It would also be desirable to be able to provide an occupancy sensor that can automatically select the optimal time delay based on an actual occupancy pattern detected by the sensor.

SUMMARY OF THE INVENTION

In accordance with the invention, a programmable occupancy sensor automatically determines loss of lamp life of a fluorescent lamp as the lamp is being used. An algorithm implemented in software or firmware and executing on preferably the sensor's microcontroller calculates lamp loss taking into account the fluorescent lamp's actual hours of operation (i.e., actual on time) and the number of off/on transitions. In one embodiment of the invention, the sensor can communicate to a user lamp life status (e.g., the percentage of lamp life remaining or used) and can alert a user when a lamp is nearing its end of life and should be replaced via a programmable push button and one or more LEDs (light emitting diodes) located on the sensor. In another embodiment of the invention, a networked occupancy sensor coupled to a display device either directly or through a lighting control system can provide a user with the same and more detailed lamp life information via graphical displays and optional audible alerts. Occupancy sensors of the invention can advantageously avoid the inconvenience or dangerous and/or hazardous conditions caused by burnt out lamps without wasting any lamps that may still have useful lamp life remaining.

Occupancy sensors of the invention also can be programmed to maximize lamp life and energy savings by automatically determining and selecting the optimal time delay from among a number of selectable time delays available in the sensor. The sensor tracks each off/on transition and the total on time of the lamp for the time delay currently programmed in the sensor based on actual occupancy patterns sensed by the sensor over a given test period (e.g., two weeks). The sensor can also concurrently simulate the effects of the remaining selectable time delays on lamp life and energy savings based on the same occupancy patterns sensed by the sensor over the given test period. Using the lamp loss algorithm mentioned above, the sensor calculates the loss of lamp life for each of the time delays and then, in one embodiment, automatically programs the sensor to operate with the time delay having the lowest loss of lamp life. The sensor can be further programmed to continue calculating lamp loss for each of the selectable time delays over consecutive test periods. After each test period, the sensor can be automatically reprogrammed with a newly determined optimal time delay should, for example, sensed occupancy patterns change.

Occupancy sensors of the invention can therefore be advantageously used to save energy and extend fluorescent lamp life automatically by turning off lamps when not needed, by reducing off/on transitions with an optimal time delay based on observed occupancy patterns, and by continuously monitoring occupancy patterns to ensure that the sensor is always operating with an optimal time delay.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIG. 14 illustrates an exemplary embodiment of a screen display for displaying lamp life status according to the invention.

DETAILED DESCRIPTION OF THE INVENTION

Figure 1:
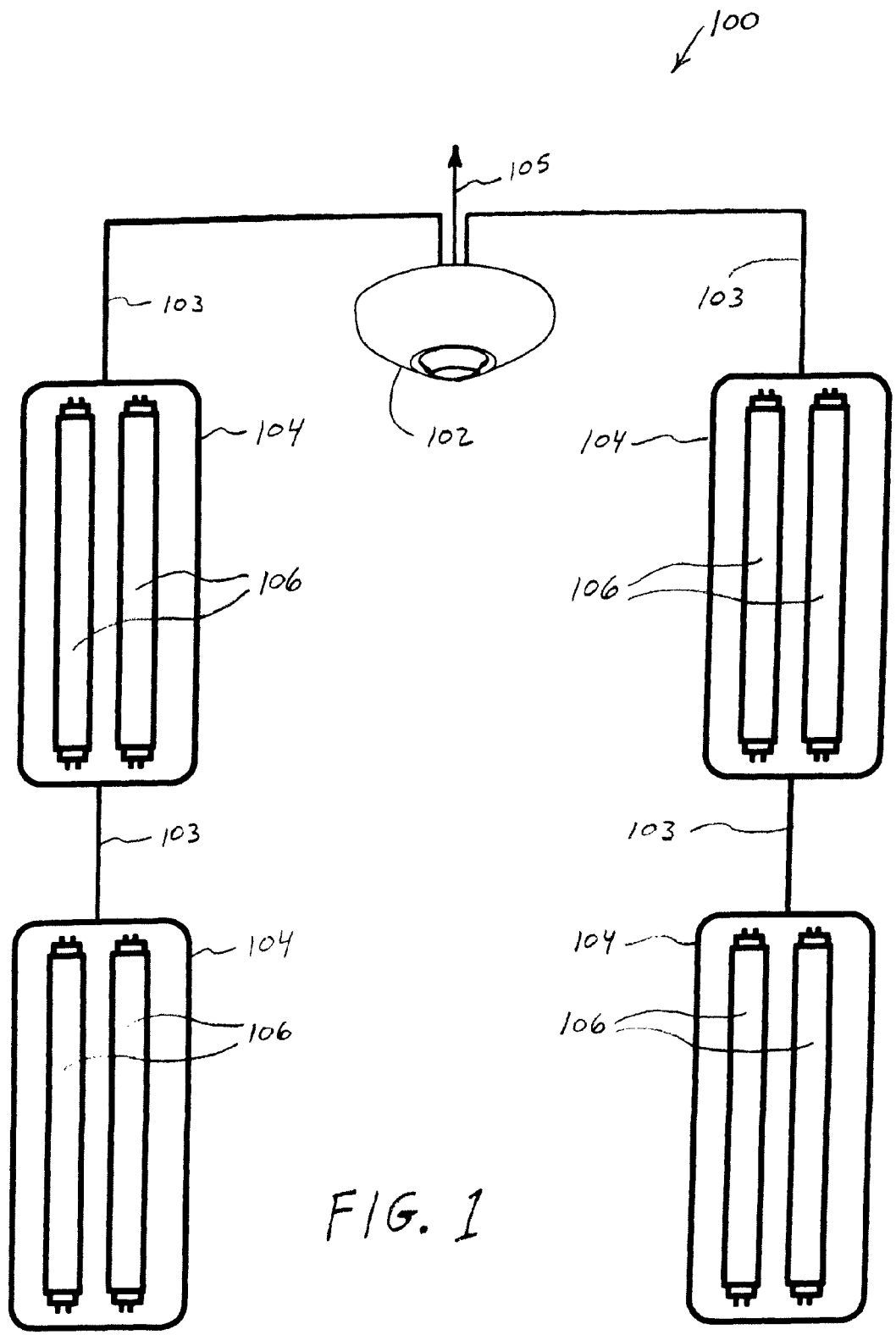
FIG. 1 is a simplified block diagram illustrating an occupancy sensor controlling fluorescent lighting according to the invention.

FIG. 1 shows a lighting control zone 100 that includes an occupancy sensor 102 coupled to four fluorescent lighting units 104, each containing two fluorescent lamps 106. Note that the number of lighting units coupled to sensor 102 and the number of fluorescent lamps 106 per lighting unit is merely illustrative and can be more or less than that shown. A lighting control zone may be, for example, an individual room or office, a classroom, a manufacturing area, a lobby, or other defined area whose lighting is controlled by an occupancy sensor. In this embodiment, occupancy sensor 102 is a ceiling mounted 360° sensor typically placed in private offices, vestibules, or small rooms. Sensor 102 is a line voltage sensor and has an integrated relay connected to power via Class 1 wiring 105 and to fluorescent lighting units 104 via Class 1 wiring 103. Sensor 102 also has an integrated microcontroller and firmware, and the ability to operate with preferably passive infrared (PIR) detection technology or both PIR and sound detection technology.

Occupancy sensor 102 controls the on/off operation of fluorescent lamps 106 based on detected occupancy. When sensor 102 senses the presence of one or more persons, the sensor generates one or more signals that cause the relay switch of the integrated relay to close. The closed relay switch connects power to the lighting units, which turns on the lamps. When occupancy is no longer sensed, a "last detected occupancy" timer activates. This timer is programmed to a selectable time delay that allows for short periods of vacancy or undetected occupancy without the lights turning off (such as, for example, when an occupant is momentarily motionless or momentarily leaves the lighting control zone and returns). The movement or return of the occupant resets the timer. Upon expiration of the time delay, the sensor generates one or more signals that cause the relay switch to open (these signals are typically of opposite logic level or polarity than the previously generated occupancy signals). The open relay switch disconnects power from the lighting units, which turns off the lamps. Occupancy sensors thus save energy by automatically turning off lights when not needed.

Figure 2:
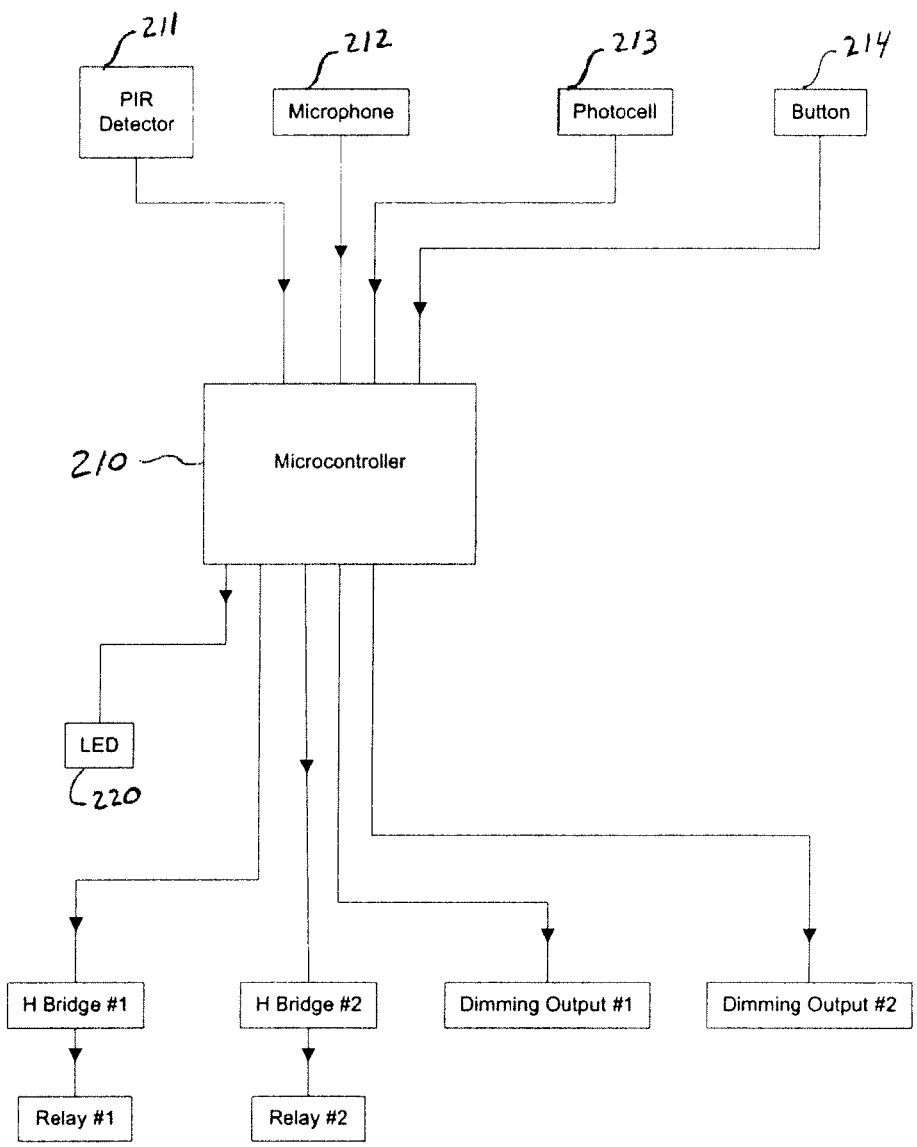
FIG. 2 is a block diagram of an exemplary embodiment of an occupancy sensor according to the invention.

FIG. 2 shows a hardware embodiment of occupancy sensor 102 in accordance with the invention. Occupancy sensor 102 includes integrated microcontroller 210, PIR detector 211, optional sound detector (microphone) 212, optional daylight detector (photocell) 213, programmable push button 214, LED 220, H-bridge #1, optional H-bridge #2, relay #1, optional relay #2, and optional dimming outputs #1 and #2 (for use with dimmable lighting ballasts and daylight detector 213). Occupancy sensor 102 can be programmed to operate with either PIR detection or both PIR and sound detection for rooms or areas that may have obstructions. (The PIR and sound detection technology may be the same as that disclosed in, for example, U.S. Pat. No. 5,701,117, which is hereby incorporated by reference). The H-bridges allow the sensors to throw the relays in either direction. That is, the H-bridges are circuits that allow current to pass in either direction (i.e., either polarity) through the relay coil to allow the rely to switch in either direction. Microcontroller 210, which is operative to execute software and/or firmware, is preferably a Texas Instruments MSP430F1132, and preferably includes one or more counters and registers and can functionally implement various timers.

The invention can include other types of occupancy sensors with different sensing capabilities in order to provide occupancy detection for rooms and areas having a wide variety of characteristics and configurations. The different types of sensors include ceiling mounted extended range 360° sensors for placement in large rooms or areas; high bay 360° sensors for placement in areas with high ceilings such as warehouses and gymnasiums; corner or ceiling mounted wide view sensors for placement in areas such as classrooms; and wall or ceiling mounted hallway sensors for placement in long narrow areas such as hallways or corridors. U.S. Pat. Nos. 6,215,398 and 6,304,180 each disclose occupancy sensing technologies that may be used in the occupancy sensors of the invention and are thus hereby incorporated by reference. All occupancy sensors of the invention have integrated microcontrollers and firmware. Occupancy sensors of the invention may be connected to other devices such as power packs/supplies, wall units, and daylight sensors, and multiple occupancy sensors may be used in the same lighting control zone to provide coverage for oddly shaped rooms or large open areas.

Note that the various embodiments of occupancy sensors that can be used with the invention may not have all of the sensing and output components shown in FIG. 2. For example, some sensors may not have relays (as described below in conjunction with FIG. 3) or only one relay. Other sensors may not have dimming outputs or only one dimming output. While still other sensors may not have daylight detector (photocell) 213, PIR detector 211, or sound detector (microphone) 212.

Figure 3:
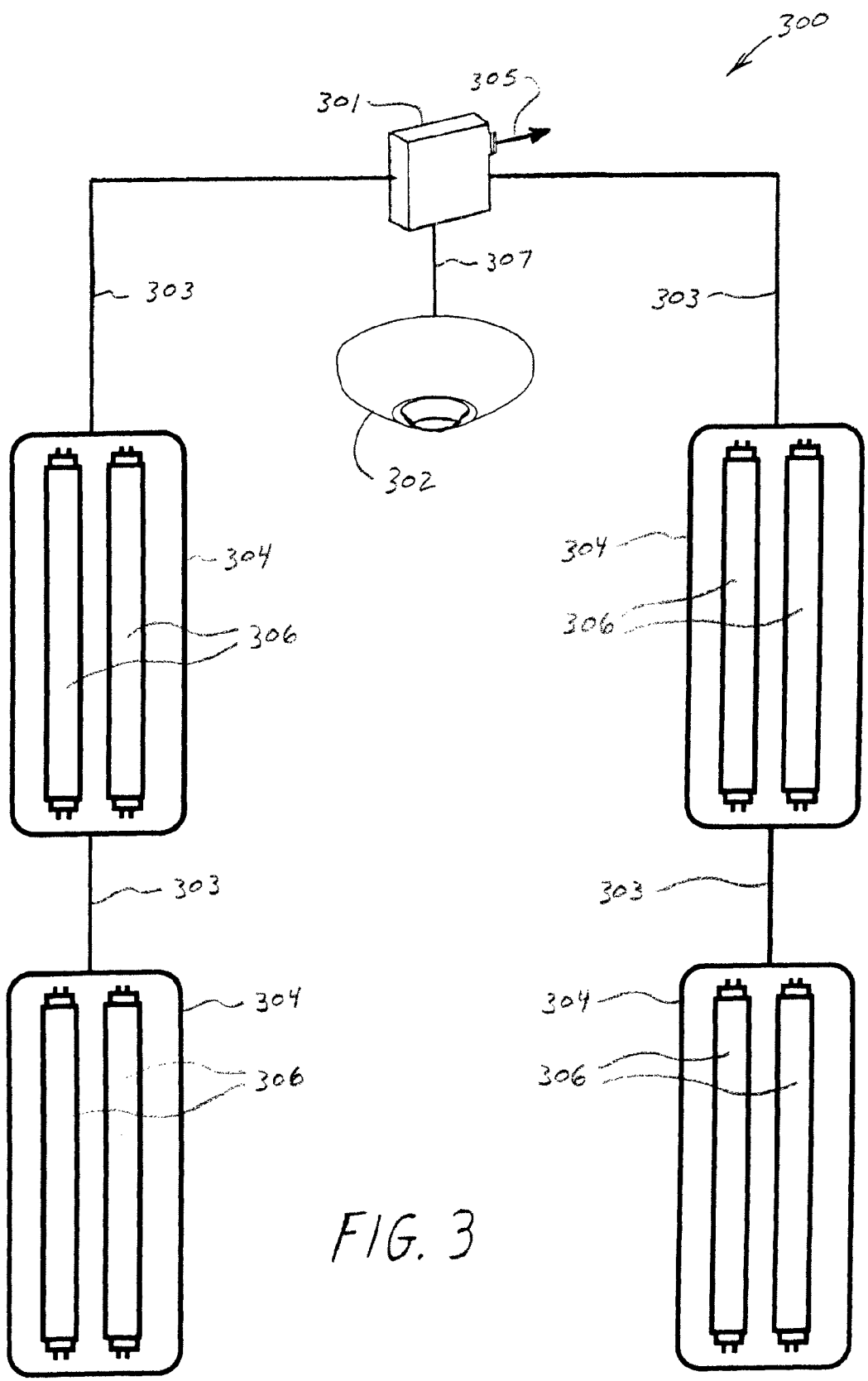
FIG. 3 is a simplified block diagram illustrating another embodiment of an occupancy sensor controlling fluorescent lighting according to the invention.

Occupancy sensors of the invention may operate with low voltage instead of line voltage (sensor 102 operates with line voltage). Low voltage sensors do not have a relay and thus communicate with relays located elsewhere within the lighting control zone. FIG. 3 shows a lighting control zone 300 that includes a low voltage occupancy sensor 302 coupled to a power supply/relay 301 via low voltage white wire 307. Power supply/relay 301 is coupled to power via Class 1 wiring 305 and to four fluorescent lighting units 304 via Class 1 wiring 303. Each lighting unit 304 contains two fluorescent lamps 306. Note again that the number of lighting units coupled to power/supply relay 301 and the number of fluorescent lamps 306 per lighting unit is merely illustrative and can be more or less than that shown. Note also that power supply/relay 301 may be coupled to other low voltage occupancy sensors (not shown) in control zone 300. Sensor 302 includes at least a microcontroller, a preferably PIR detector (e.g., PIR detector 211), a programmable push button (e.g., push button 214), an LED (e.g., LED 220), and a white wire signal driver. Sensor 302 receives power from power supply/relay 301 via a low voltage connection and communicates occupancy information to power supply/relay 301 via white wire 307. That is, when occupancy is detected by sensor 302 (or any other sensor coupled to power supply/relay 301 via white wire 307), sensor 302 drives the white wire typically high (unless negative logic signaling is used), which causes power supply/relay 301 to close its relay switch. The closed relay switch connects power to the lighting units, which turns on the lamps. Other devices coupled to the white wire can sense the state of the white wire (and thus occupancy) and accordingly perform other associated processes (e.g., enable optional sound detectors). The remaining functionality of occupancy sensor 302, and in particular operation of a "last detected occupancy" timer, is identical or at least substantially identical to occupancy sensor 102.

In other embodiments of the invention, daylight sensing can be used jointly with occupancy sensing to achieve even greater energy savings. Daylight sensing may be provided by a separate daylight sensor, or the occupancy sensor may have built in daylight sensing capability such as provided by optional daylight detector (photocell) 213. Lighting control decisions may be made using occupancy as the primary factor and daylight as the secondary factor as follows:

| | |
|---|---|
| Occupancy detected and insufficient daylight: | lights on; |
| Occupancy detected and sufficient daylight: | lights off; |
| No occupancy detected and insufficient daylight: | lights off; and |
| No occupancy detected and sufficient daylight: | lights off; |

Fluorescent lamps, which are commonly used in many types of commercial, institutional, and industrial buildings, are gas-discharge lamps that use electricity to excite mercury vapor. The excited mercury atoms produce short-wave ultraviolet light that causes a phosphor to fluoresce, producing visible light. Fluorescent lamps require a ballast to regulate the flow of electrical power through the lamp. Although the initial cost of fluorescent lamps is higher than that of incandescent lamps, fluorescent lamps convert electrical power into useful light more efficiently, and thus operate at lower energy costs than incandescent lamps.

The lamp life of a fluorescent lamp, usually expressed in terms of operating hours is affected predominately by three operating factors. The first is the amount of time the lamp is actually on, which is dependent on the structural integrity of the lamp's tungsten coil and on the electron-emissive coating of the lamp's filament. The electron-emissive coating evaporates while the lamp is on. The second factor is the number of times a lamp is turned on. Each off/on transition causes a quantity of the coating to be dislodged from the cathode. The third factor is the minimum time the lamp is left on. Fluorescent lamps require the presence of a certain amount of free barium in order to have ignitions that do not damage the tungsten coil. Free barium is released from the emitter material of the lamp while the lamp is on. If a lamp is not on long enough after each off/on transition, enough free barium is not released and thus will not be present for the next ignition. The tungsten coil is then in danger of cracking or breaking, which will cause the lamp to fail.

The manner in which the lamp is operated determines which of the three factors is predominate. If a lamp is turned off and on very infrequently (long on times/start), the amount of time the lamp is on becomes the predominate lamp loss factor. If the lamp is turned off and on more frequently (short on times/start), the number of off/on transitions becomes the predominate lamp loss factor. And if the lamp is turned on and off below the threshold for allowing enough free barium to be released, increasing the likelihood of damage to the tungsten coil, the short on times become the predominate lamp loss factor.

Figure 4:
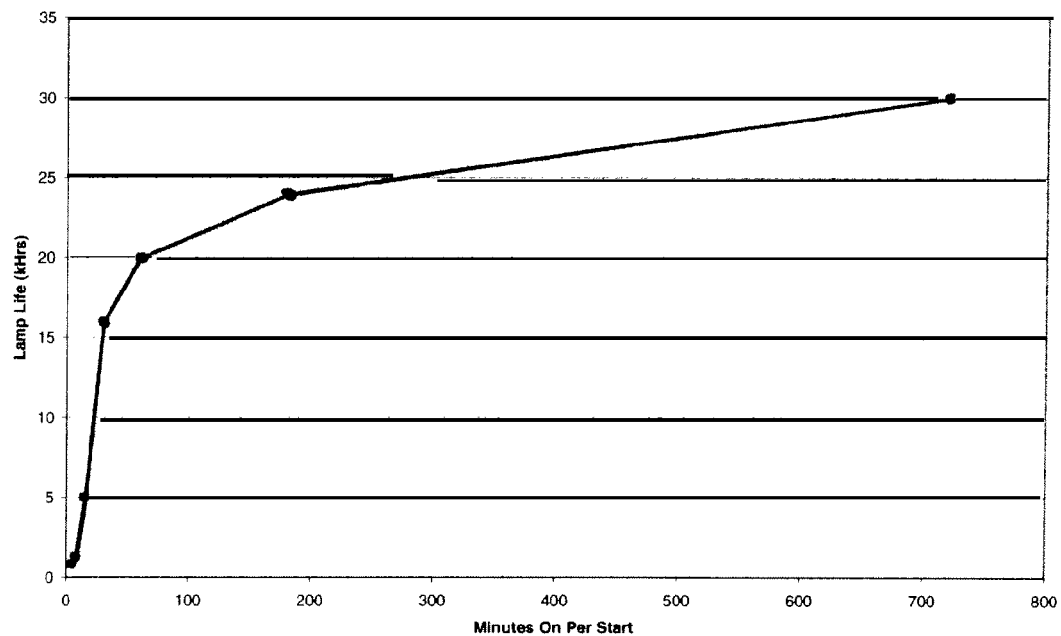
FIG. 4 is a known graph of lamp life versus minutes-on per start for a common fluorescent lamp.

Fluorescent lamp manufacturers publish "lamp life versus minutes/start" graphs that account for the above lamp loss factors. The graph is a plot of lamp operating hours versus minutes that the lamp is on after each start (off/on transition). FIG. 4 shows such a graph for a common T8 fluorescent lamp. Note that the longer the lamp is on after each off/on transition, the higher the lamp's operating hours. Conversely, the shorter the lamp is on after each off/on transition, the lower the lamp's operating hours. Compare the T8's lamp life of 30,000 hours when left on for 700 minutes (about 11.7 hours) after each off/on transition versus a lamp life of only 5,000 hours when left on for only 15 minutes after each off/on transition. Lamp life significantly decreases as the frequency of off/on switching increases. In other words, turning fluorescent lamps off and on excessively, dramatically shortens lamp life either from the off/on transitions themselves and/or damage to the tungsten coil.

To substantially eliminate the possibility of the tungsten coil cracking or breaking because of an insufficient amount of free barium, occupancy sensors of the invention have a user programmable "required on-time delay" setting. A "lamp on time" timer implemented in the firmware of the microcontroller in the sensor tracks how long the lamp is on and resets whenever the lamp is turned off. The "required on-time delay" setting prevents the sensor from turning off the lamp until the value of the "lamp on time" timer meets this setting regardless of occupancy. The "required on-time delay" is separate from, and overrides the sensor's programmable "last detected occupancy" time delay when both delays are active concurrently. (Recall that the "last detected occupancy" time delay allows for short periods of vacancy and undetected occupancy without the lights turning off). Both delays may be active concurrently when, for example, a person enters a room causing the lamps to turn on and then leaves the room a few moments later. The "required on-time delay" will force the lamps to stay on beyond the expiration of the "last detected occupancy" time delay if the "required on-time delay" is longer by at least those few moments of detected occupancy. The required on-time delay forces the lamp to stay on long enough after each off/on transition to ensure that enough free barium is released for the next off/on transition, thus avoiding damage to the tungsten coil and premature lamp failure. The value of the required on-time delay depends on the type of lamp and ballast combination used, because each combination has different performance characteristics that depend on switching frequency. For example, if an instant start ballast is used, the required on-time delay may be 30 minutes. If a programmed start ballast is used, the value may be 15 minutes. The sensor can be programmed with this delay via, for example, the sensor's push button 214 or, in other embodiments discussed further below, remotely using computer processing devices coupled to the sensor. Once this minimum required on time is met, the other two lamp loss factors, the number of off/on transitions and the total amount of lamp on time, become the predominate operating factors affecting lamp life.

Because energy usage is also a cost consideration in fluorescent lamp operation, maximizing lamp life alone by simply leaving the lamps on for long periods of time may not be the obvious solution that the graph of FIG. 4 seems to indicate unless, of course, a particular lighting control zone covers, for example, a windowless continuously occupied area that requires constant lighting. For those lighting control zones that do not need lamps to be on constantly, the benefit of longer lamp life obtained from keeping the lamps on for long periods of time may be offset by increased energy cost—the longer a lamp is on, the higher the energy cost. However, the benefit of turning off lamps when not needed also needs to be weighed against lamp loss caused by an increased number of off/on transitions resulting from the lamps being turned off more often.

Figure 5:
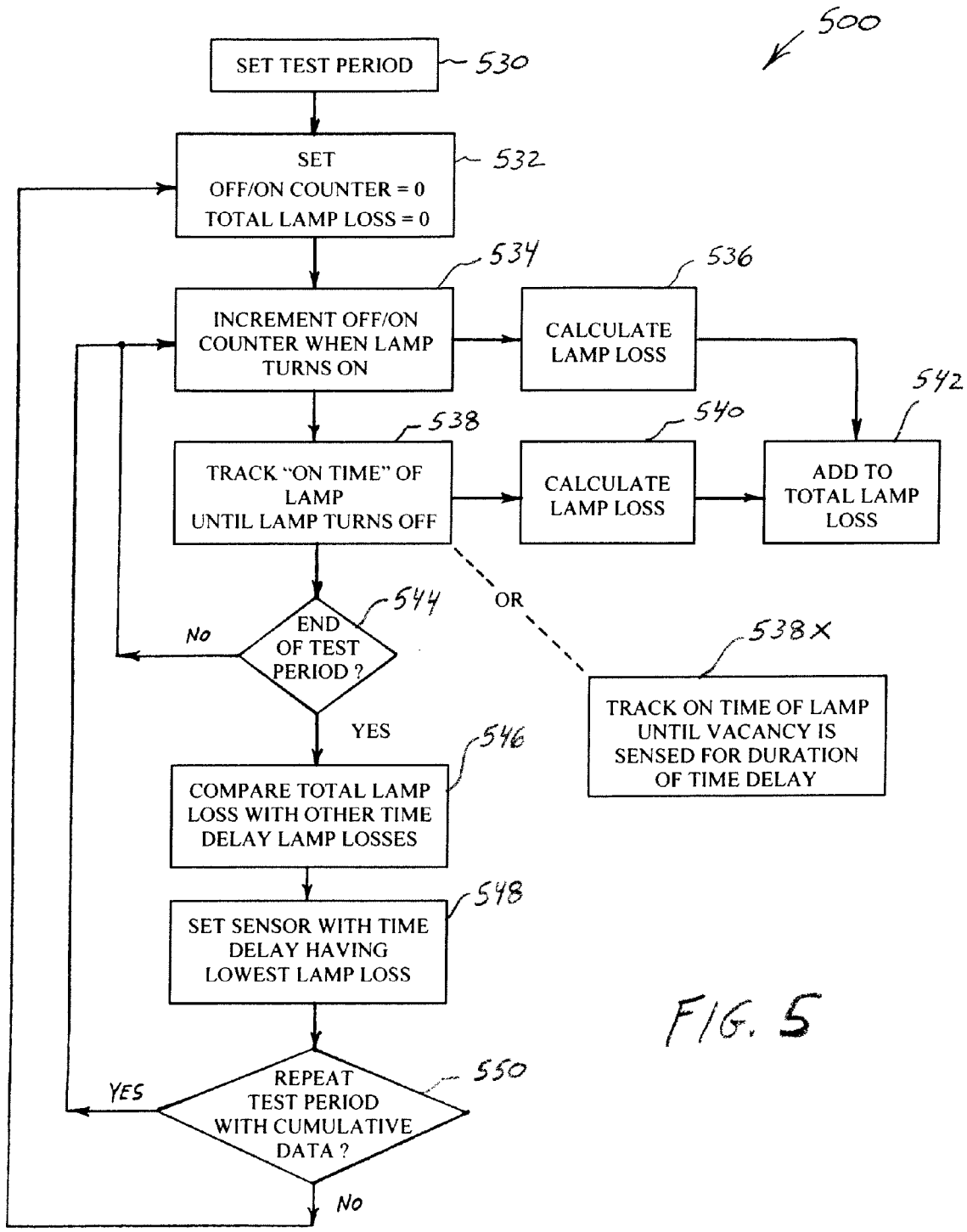
FIG. 5 is a flowchart of an exemplary embodiment of an algorithm for determining an optimal time delay for an occupancy sensor according to the invention.

FIG. 5 shows a flowchart of one embodiment of an algorithm that can maximize lamp life and energy savings according to the invention. Algorithm 500 can be implemented in software or firmware or combinations of both and can be executed by an occupancy sensor of the invention such as occupancy sensors 102 or 302. Algorithm 500 weighs three factors based on the lamp's actual usage to automatically determine an optimal time delay from among a number of selectable time delays available for a given occupancy sensor. The lamp's usage depends on how the lighting control zone is normally occupied (i.e., the control zone's occupancy pattern). The three factors are lamp loss while the lamp is on, lamp loss from the number of off/on transitions, and energy usage while the lamp is on. The first two factors are dependent on the types of ballast and lamp used, and the third is dependent on the relative value a user places on saving energy versus saving lamp life. If saving energy is not a concern, this factor can be set to zero and the algorithm will optimize the time delay based solely on lamp life savings. If energy savings is weighed as a factor, energy usage during lamp on time is counted as a negative, equivalent to loss of lamp life. That is, the total lamp life lost for each lamp on period is calculated and then an additional weighted amount of lost lamp life is added to account for energy usage. The amount of weighting is set by the user and should be dependent on the relative costs of powering the lamp versus replacing the lamp.

Algorithm 500 automatically determines the optimal time delay by advantageously calculating in real time the loss of lamp life based on the actual occupancy pattern observed by the sensor and on the actual "last detected occupancy" time delay programmed in the sensor (which may be, for example, the factory default setting). Algorithm 500 also concurrently calculates in real time the loss of lamp life and energy usage for each of the selectable time delays to which the sensor could be programmed. That is, the algorithm concurrently simulates the effect of each selectable time delay on lamp life and energy usage as if the sensor were respectively programmed to these time delays. The result is an estimate of the loss of lamp life and energy usage for each of the available time delays. Algorithm 500 then chooses the time delay that results in the optimal combination of low loss of lamp life and low energy usage in accordance with the relative weighting of these factors.

Algorithm 500 can also provide a user with statistics relevant to the lamp's expected lifetime based on the lamp's current "last detected occupancy" time delay setting and actual operation as controlled by the sensor. The lamp loss calculated by algorithm 500 is preferably stored in the sensor's microcontroller and can be provided to the user in the form of percent of lamp life used or percent of lamp life remaining via the push button and LED or a display device (described further below). This allows the user to judge when lamps should be replaced based on actual usage of the lamps. Along with the loss estimate, the total number of off/on transitions and the total on time are also preferably stored in the sensor's microcontroller and can be provided to the user. When the lamps are replaced, this information can easily be reset to track the operation of the new lamps.

As shown in FIG. 5, algorithm 500 begins by setting the length of a test period at block 530. For example, the test period may be two weeks. During this period, the occupancy sensor functions normally with its programmed (e.g., default) "last detected occupancy" time delay, which may be, for example, 15 minutes. Delay time settings representing each of the selectable time delays are also maintained in the sensor during this period to simulate the functionality of the selectable time delays given the sensed occupancy conditions. Data is updated in real time based on the performance of each of the possible time delays. At the conclusion of the test period, the resulting data is used to determine the optimal time delay. The sensor can be programmed to continue updating the existing data for a subsequent test period. At the conclusion of the subsequent test period, the data is evaluated and a different optimal time delay may be chosen if indicated by the data. This cycle of further refining the data can continue for the life of the sensor or until the user resets the stored history, in which case the algorithm can begin anew.

At block 532, an off/on counter and a total lamp loss register are set to zero to initialize the algorithm.

At block 534, the off/on counter is incremented each time the lamp turns on.

At block 536, the loss of lamp life resulting from each off/on transition is calculated using Equation 1.

$$LossFromStarts = Starts \times A \qquad \text{Equation 1}$$

Constant A represents the loss per start for a given lamp/ballast combination and is described in more detail further below. Loss is defined as the fraction of the total loss available. Equation 1 can be redefined as necessary to include any factor that may affect the amount of loss for a given start and thus may contain any number of constants.

At block 538, the "lamp on time" timer in the occupancy sensor keeps track of the time the lamp is on until the lamp turns off (i.e., while occupancy is sensed and for the duration of the "last detected occupancy" time delay programmed in the sensor).

At block 540, algorithm 500 uses Equations 2 and 3 below to calculate losses that occurred while the lamp was on. As in Equation 1, Equations 2 and 3 can be redefined as necessary to include any factor that may affect the cumulative loss and thus may contain any number of constants. Note that the rate of loss decreases as the length of time the lamp is on increases. Constant B represents the initial instantaneous loss rate given a particular lamp/ballast combination. Constant C represents the rate of change in the instantaneous loss and is also dependent on the particular lamp/ballast combination. (Constants B and C are described more fully below.) Equation 2 is only applied until the instantaneous loss rate reaches zero as defined by Equation 3.

$$CumulativeLoss = (B)TimeOn - \left(\frac{C}{2}\right)TimeOn^2 \qquad \text{Equation 2}$$

$$InstLoss = \frac{d}{dt}\left[(B)TimeOn - \left(\frac{C}{2}\right)TimeOn^2\right] \qquad \text{Equation 3}$$
$$= (B) - (C)TimeOn$$

At block 542, the total loss for a first "event," which is defined as a start (off/on transition) followed by a discrete period of lamp on time, is summed using Equation 4.

$$LossFromEvent = A + (B)TimeOn - \left(\frac{C}{2}\right)TimeOn^2 \quad \text{Equation 4}$$

Constants A, B, and C used in Equations 1-4 are based on the type of lamp/ballast combination used in the lighting unit. The lamp life vs. time-on-per-cycle graphs published by lamp and ballast manufacturers are based on lamps that are cycled at different rates within a range of rates, where each rate is applied repeatedly until the lamp burns out. This situation is different than actual lamp usage where the time-on-per-cycle typically varies widely throughout the life of the lamp. Because each time-on-per-cycle is the same in the published data, the loss from each cycle can be assumed to be the same. Therefore, because the loss from each cycle is an equal fraction of the total loss available, the total number of cycles that will occur for a given time-on-per-cycle can be determined as shown in Equation 5.

$$TotalCycles = \frac{1}{LossFromCycle} \quad \text{Equation 5}$$

The total number of cycles is then multiplied by the time-on-per-cycle to determine the total lamp life as shown in Equation 6.

$$LampLife = \frac{TimeOn/Cycle}{LossFromCycle}$$
$$= \frac{TimeOn/Cycle}{A + (B)(TimeOn/Cycle) - \left(\frac{C}{2}\right)(TimeOn/Cycle)^2} \quad \text{Equation 6}$$

From Equation 6, which relates the time-on-per-cycle to lamp life, values for the constants A, B and C can be found such that the results closely match the data in the lamp life vs. time-on-per-cycle charts provided by manufacturers. One method to determine constants A, B and C is via an optimization program that optimizes the constants so the error between the formula results and the manufacturers' data is minimized. The program starts with initial values for constants A, B and C and calculates lamp life using Equation 6 for each of the supplied data points. The difference between the lamp life predicted by Equation 6 and the manufacturers' data is considered the error. The program then randomly increments or decrements each constant and rechecks the error. If the error decreases, the new value is kept and the process repeats. The resulting values for constants A, B and C are values that the program has determined to have the least collective error relative to the manufacturer's data. Table 1 below shows the resulting values of constants A, B and C for several representative lamp/ballast combinations. Using Equation 6 and the constants below, the calculated lamp life for each of the lamp/ballast combinations in Table 1 very closely matches the actual lamp life data published by the manufacturers.

TABLE 1

| Ballast | Lamp | A (Loss) | B (Loss/kHr) | C (Loss/kHr$^2$) |
|---|---|---|---|---|
| Manufacturer A Instant Start | Manufacturer B Standard Lamp | 1.15E−05 | 0.0396 | 1.2000 |
| Manufacturer A Instant Start | Manufacturer B Deluxe Lamp | 1.46E−05 | 0.0291 | 0.4240 |
| Manufacturer A Program Start | Manufacturer B Standard Lamp | 4.68E−06 | 0.0313 | 0.6630 |
| Manufacturer A Program Start | Manufacturer B Deluxe Lamp | 5.39E−06 | 0.0260 | 0.0228 |
| Manufacturer C Instant Start | Manufacturer D Standard Lamp | 4.50E−05 | 0.0560 | 3.0300 |
| Manufacturer C Instant Start | Manufacturer D Deluxe Lamp | 5.10E−05 | 0.0397 | 0.9300 |
| Manufacturer C Program Start | Manufacturer D Standard Lamp | 1.50E−05 | 0.0484 | 2.3280 |
| Manufacturer C Program Start | Manufacturer D Deluxe Lamp | 1.00E−05 | 0.0400 | 1.2629 |

As algorithm 500 is applied to the actual operation of the lamp as controlled by the actual "last detected occupancy" time delay programmed in sensor, algorithm 500 is also applied concurrently to a simulated operation of the lamp as would be controlled by each of the available selectable time delays (i.e., the selectable time delays other than the actual time delay programmed in the sensor). At block 538X, respective timers implemented in the firmware of the microcontroller in the occupancy sensor keep track of the time the lamp is on or would be on for each of the "simulated" selectable time delays. These timers track lamp on time through the full duration of the respective simulated time delays, even if the actual lamp has turned off because of expiration of the actual programmed time delay. Then, as each simulated time delay expires, algorithm 500 uses the respective value of the timer associated with that simulated time delay to calculate the lamp loss for that simulated time delay.

Figure 6:
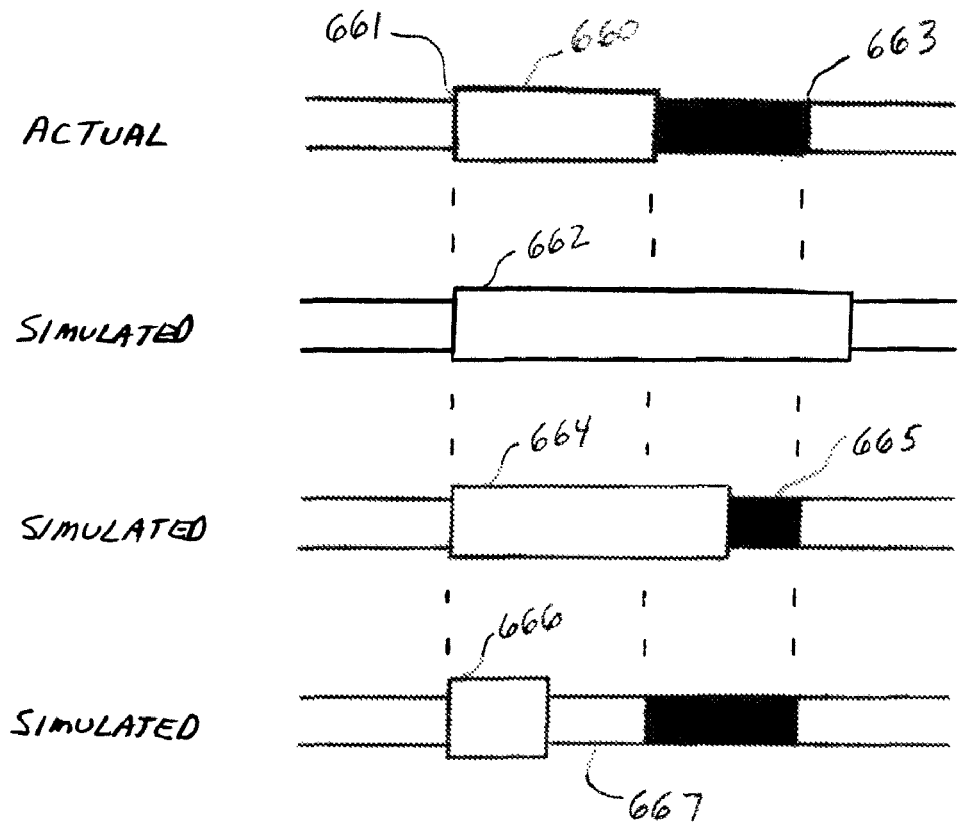
FIG. 6 illustrates the temporal relationships between actual and simulated occupancy sensor time delays on lamp operation according to the invention.
Figure 6:
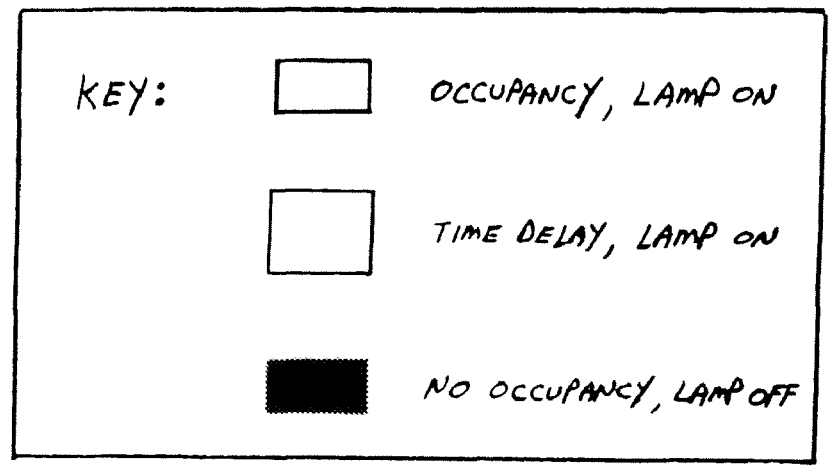

FIG. 6 illustrates the simulated time delays in relation to the actual time delay. Actual time delay 660 and simulated time delays 662, 664, and 666 begin at the same time 661 of last detected occupancy. For simulated time delay 662, algorithm 500 will continue tracking lamp on time as if the lamp never turned off and will not count off/on transition 663 for that simulated delay time, because the length of simulated time delay 662 extends beyond both the actual time delay 660 and the actual occurrence of the next off/on transition 663. Thus, the lamp would not have turned off and then back on again had simulated time delay 662 been programmed in the sensor. Similarly, because simulated time delay 664 is longer than actual time delay 660, but expires before the actual occurrence of next off/on transition 663, algorithm 500 will calculate the simulated time delay's lamp loss with the shorter off time 665. And lastly, because simulated time delay 666 is shorter than actual time delay 660, algorithm 500 will not treat the on time difference 667 between simulated time delay 666 and actual time delay 660 as lamp on time against simulated time delay 666, because the lamp would have turned off had simulated time delay 666 been programmed in the sensor.

Returning to FIG. 5, block 544 determines whether the test period has ended. If not, the algorithm returns to block 534 and awaits another off/on transition, whereupon blocks 536, 538, and 540 perform the same functions for this next event.

The calculation at block 542, however, now expands to also calculate the total cumulative loss from all observed events. That is, algorithm 500 calculates at block 542 the loss from each event as it occurs using Equation 4 and then sums the result with the previous total losses using Equation 7 below to keep a running total of the cumulative lamp loss from the series of observed off/on transitions and accompanying lamp on times.

$$TotalLoss = \sum_{i=1}^{n} LossFromEvent_i \quad \text{Equation 7}$$

When the test period ends, the total cumulated lamp loss calculated during the test period for each selectable time delay, including the simulated time delays and the actual time delay programmed in the sensor, are compared at block 546 to determine which time delay has the lowest lamp loss. If the occupancy sensor has been optionally programmed to at this point only report the results of the analysis to a user, algorithm 500 may await a reply from the user before proceeding further.

Preferably, however, the occupancy sensor is programmed to automatically replace at block 548 the currently programmed time delay with the optimal time delay most recently determined to have the lowest calculated lamp loss.

In alternative embodiments of the invention, the occupancy sensor has a second and/or a third time delay setting in addition to the programmable time delay setting. The programmable time delay setting is automatically set internally by algorithm 500 to the most recently determined optimal time delay, whereas the second and third time delay settings have values that are user selectable. If a user sets the second time delay, the lamp will not be permitted to turn off after the "last detected occupancy" timer activates until the value of this timer exceeds both the programmable and second time delays. If a user sets the third time delay, the lamp will turn off after the "last detected occupancy" timer activates when the value of this timer exceeds the third time delay regardless of the value of the programmable time delay. In other words, the second and third programmable time delay settings override the internally set programmable time delay setting when the programmable time delay is either less than the second time delay or more than the third time delay.

To summarize the operation of the occupancy sensor with respect to the various time delays described above, in the first embodiment, lamps will not turn off until they have been on for the required on-time delay and occupancy has not been detected for the full duration of the programmed optimal "last detected occupancy" time delay. In an alternative embodiment, the lamps will not turn off until the lamps have been on for the required on-time delay and occupancy has not been detected for the longer of the full duration of the programmed optimal time delay or the user programmed second time delay. In the same or another alternative embodiment, the lamps will turn off when they have been on for the required on-time delay and occupancy has not been detected for the shorter of the full duration of the programmed optimal time delay or the user programmed third time delay.

The occupancy sensor is also preferably programmed to automatically repeat algorithm 500 for another test period. At block 550, user programming indicates whether algorithm 500 will repeat with cumulative lamp loss data or will repeat anew with fresh data, such as, for example, when a new lamp is installed. If algorithm 500 is to repeat anew, control returns to block 532, where the off/on counter and total lamp loss register are reset to zero. If algorithm 500 is to repeat with cumulative data, control returns to block 534, where the next off/on transition is awaited. Note that algorithm 500 uses the cumulative lamp loss data to also continue updating the lamp's current lamp life status. A third option (not shown in FIG. 5) is to repeat the algorithm with cumulative data, but to weigh it less in the determination of an optimal time delay for the current test period. A user can program the weighting of the cumulative data. This prevents, for example, previous outdated occupancy patterns from incorrectly influencing the calculations, such as, for example, when a file room is converted into an office. A user can set the weighting of the cumulative data to zero, which prevents that data from influencing the current calculations, but still allows the cumulative data to be used to determine remaining lamp life.

Figure 7:
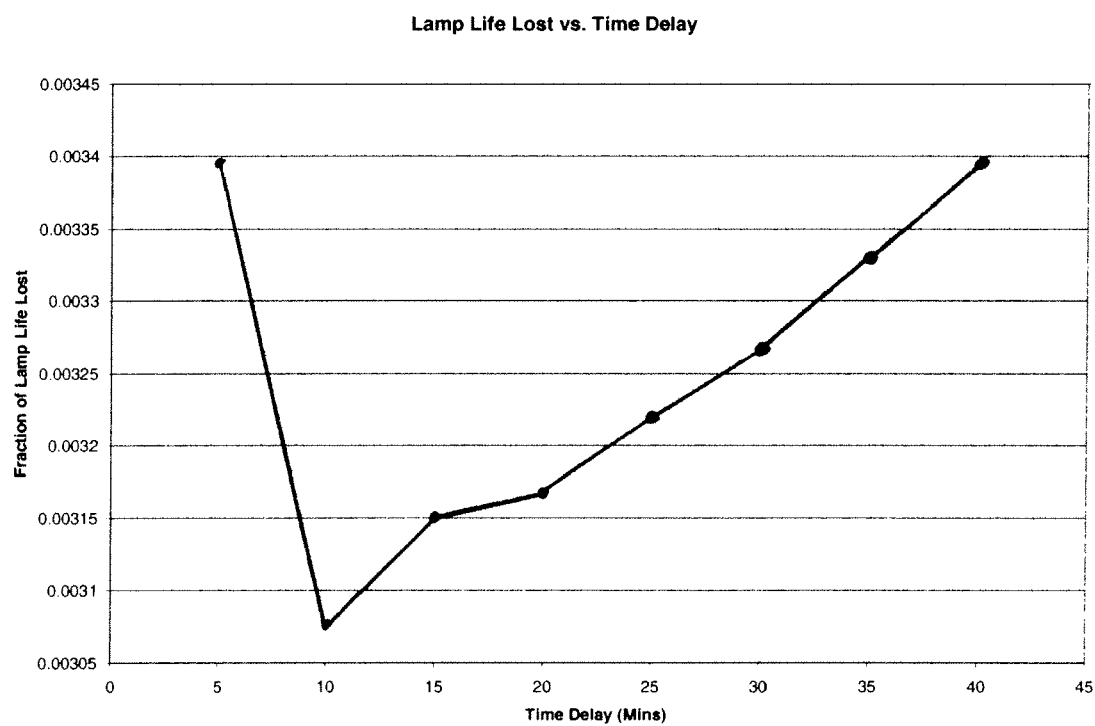
FIG. 7 is a graph of lamp loss versus time delay determined by the algorithm of FIG. 5 for a first occupancy pattern according to the invention.

Table 2 and FIG. 7 show an example of lamp losses calculated by algorithm 500 for a plurality of selectable time delays based on a lighting control zone having an occupancy pattern characterized by relatively short unoccupied periods that average less then ten minutes throughout the day followed by long unoccupied periods overnight. As shown, the results of algorithm 500 indicate that the optimal time delay for this occupancy pattern is 10 minutes—a time delay long enough to prevent the lights from turning off during the short unoccupied periods during the day, but still short enough to allow the lights to turn off without wasting unnecessary on time during the long unoccupied periods overnight. Note that the shortest time delay (5 minutes) incurs lamp loss predominately from the excessive starts (off/on transitions), while the longest time delays (30+ minutes) incur lamp loss predominately from the excessive on times without any reduction in the number of starts.

TABLE 2

| Time Delay | Starts | Time On(Hours) | Fraction Of Lamp Life Lost |
|---|---|---|---|
| 5 Minutes | 44 | 77.7 | 0.0033966 |
| 10 Minutes | 27 | 77.2 | 0.0030761 |
| 15 Minutes | 27 | 79.3 | 0.0031505 |
| 20 Minutes | 24 | 81.2 | 0.0031680 |
| 25 Minutes | 23 | 83.1 | 0.0032199 |
| 30 Minutes | 22 | 84.9 | 0.0032666 |
| 35 Minutes | 22 | 86.7 | 0.0033305 |
| 40 Minutes | 22 | 88.6 | 0.0033942 |

Figure 8:
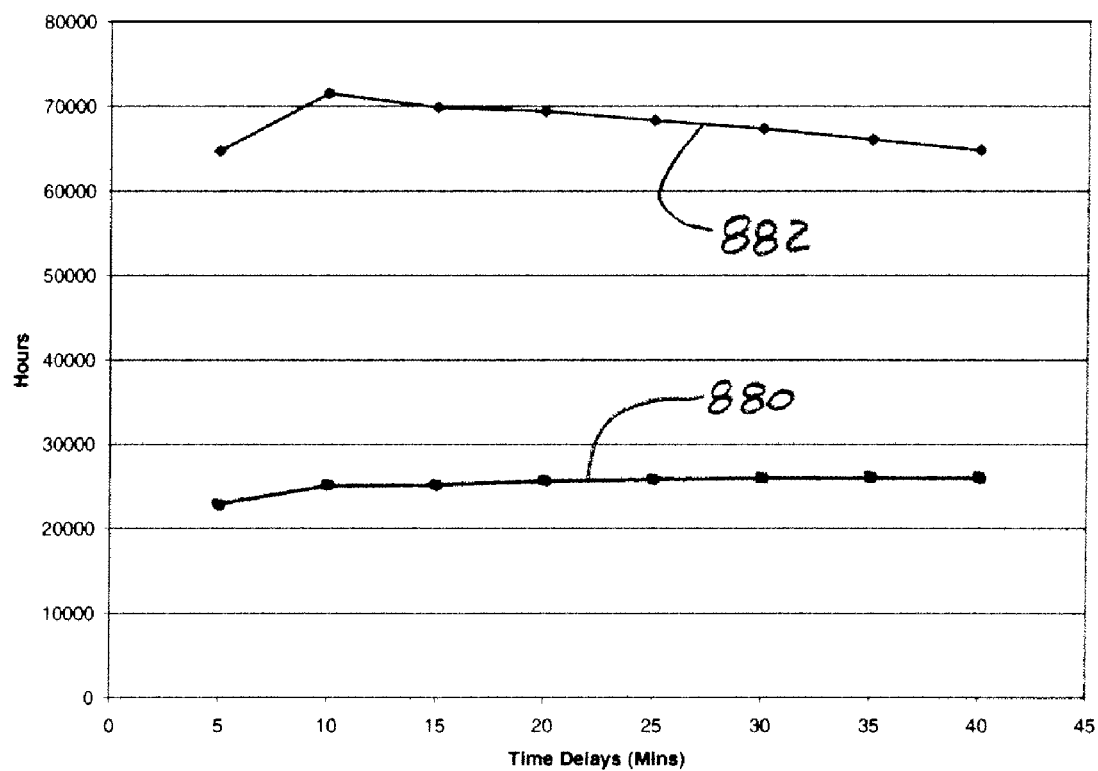
FIG. 8 is a graph of lamp life and calendar life versus time delay for the first occupancy pattern according to the invention.

FIG. 8 shows the effect of the calculated lamp losses per time delay above on lamp life 880 and calendar life 882 of the lamp. Although the number of operating hours increases just slightly with longer time delays for lamp life 880, actual calendar life 882 benefits from the shorter, optimal time delay of 10 minutes, which corresponds to about 423 weeks of calendar life versus 387 weeks of calendar life for a 40 minute time delay. Also note from FIG. 4 that the lamp life of about 25,000 hours resulting from the 10 minute time delay is equivalent to a T8 fluorescent lamp cycled at about 275 minutes (about 4.6 hours) per start. Algorithm 500 has thus advantageously maximized energy savings without sacrificing lamp life.

Figure 9:
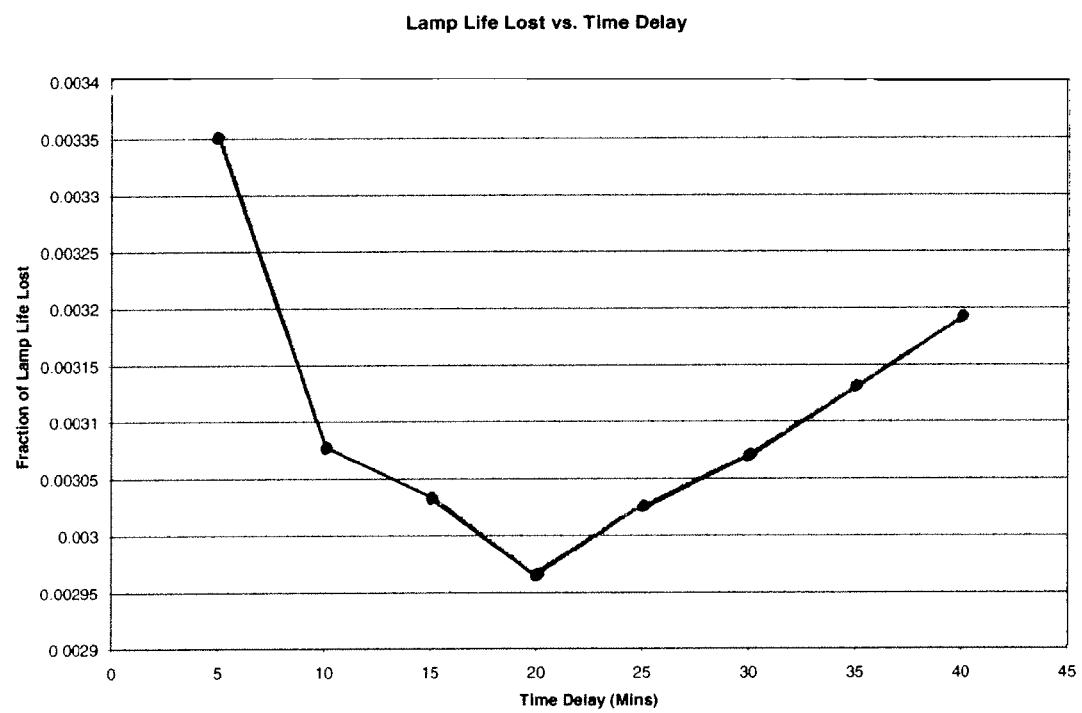
FIG. 9 is a graph of lamp loss versus time delay determined by the algorithm of FIG. 5 for a second occupancy pattern according to the invention.

Table 3 and FIG. 9 show a second example of lamp losses calculated by algorithm 500 for a plurality of selectable time delays. In this example, the lighting control zone is unoccupied for periods averaging about fifteen minutes throughout the day. As shown, the results of algorithm 500 indicate that the optimal time delay for this occupancy pattern is 20 minutes—a time delay that will prevent the lamps from turning off during those unoccupied fifteen minute periods. The results indicate that the lamp loss caused by the lamps staying on during those unoccupied fifteen minute periods is less than the lamp loss caused by the increased number of starts (on/off transitions) that would result from a shorter time delay.

TABLE 3

| Time Delay | Starts | Time On(Hours) | Fraction Of Lamp Life Lost |
|---|---|---|---|
| 5 Minutes | 50 | 73.3 | 0.0033523 |
| 10 Minutes | 31 | 75.2 | 0.0030791 |
| 15 Minutes | 27 | 76.2 | 0.0030344 |
| 20 Minutes | 22 | 77.2 | 0.0029656 |
| 25 Minutes | 22 | 78.9 | 0.0030243 |
| 30 Minutes | 21 | 80.6 | 0.0030707 |
| 35 Minutes | 21 | 82.3 | 0.0031317 |
| 40 Minutes | 21 | 84.1 | 0.0031925 |

Figure 10:
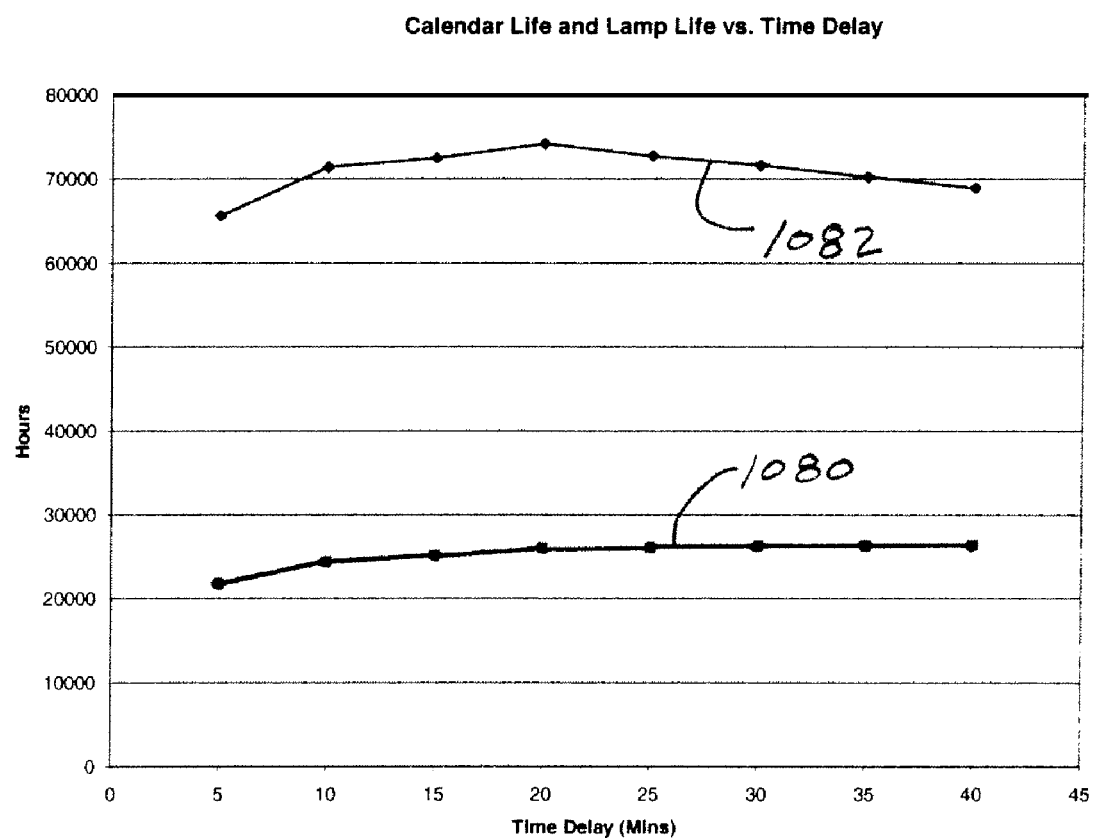
FIG. 10 is a graph of lamp life and calendar life versus time delay for the second occupancy pattern according to the invention.

FIG. 10 shows the effect of the calculated lamp losses per time delay for the second example on the lamp life and calendar life of the lamp. Again, although the number of operating hours increases just slightly with longer time delays for lamp life 1080, actual calendar life 1082 benefits from the shorter, optimal time delay of 20 minutes, which corresponds to about 443 weeks of calendar life versus 411 weeks of calendar life for a 40 minute time delay.

Lamp life status and related information can be communicated to a user by occupancy sensors 102 and 302 via their programmable push buttons and LEDs. A user can request the percent of lamp life used, the number of off/on transitions, and the number of lamp on hours by pushing the push button a specified number of times to retrieve a given piece of information. The information is then fed back to the user through consecutive blinks of the LED. For example, to retrieve the percent of lamp life used in one embodiment, the user presses the push button three times. The first digit of the percent of lamp life used is communicated to the user by a number of consecutive LED blinks. After a pause, the second digit is communicated in the same manner. A value of zero for a digit is fed back via a short sequence of rapid flashing of the LED. After the percent is fed back to the user, a long pause occurs and the cycle may repeat a number of times (e.g., three times). Thus, if lamp life used is 60%, the LED first blinks six times followed by a pause and then a short sequence of rapid flashing. Similarly, to retrieve the number of off/on transitions, the push button may need to be pressed, for example, four times. To retrieve the number of lamp on hours, the push button may need to be pressed, for example, five times. To shorten the information that needs to be communicated, the number of off/on transitions may be represented as thousands of starts and the number of lamp on hours may be represented in thousands of hours. Lamp life information and the collected time delay data can also be cleared from the sensor by a respective series of push button commands.

Occupancy sensors of the invention may also be programmed to alert a user that lamps should be replaced. For example, the sensor's microcontroller can be programmed to cause the sensor's LED to blink slowly and continuously when lamp loss exceeds a pre-set amount, such as, for example, 99%. Alternatively or additionally, the sensor may provide an audible alert when, for example, lamp loss exceeds a pre-set amount and the push button is pressed (regardless of the reason for pressing the push button), thus alerting a user with sound that the lamps controlled by the sensor should be replaced.

Figure 11:
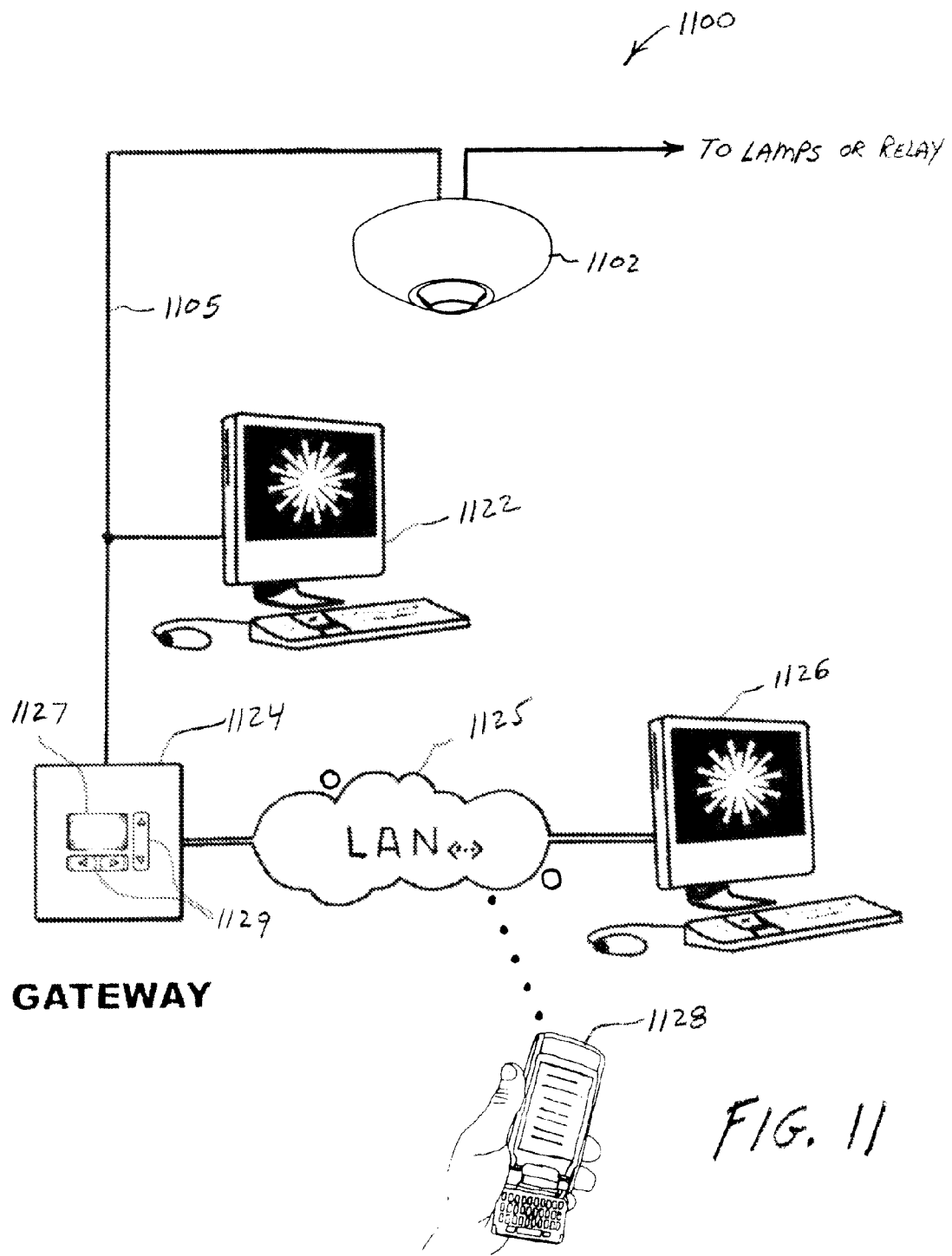
FIG. 11 is a simplified block diagram of a lighting control system according to the invention.

FIG. 11 shows another embodiment of the invention. Networked occupancy sensor 1102 is coupled to various devices capable of either programming sensor 1102, displaying information received from sensor 1102, and/or storing data received from sensor 1102. Occupancy sensor 1102 is coupled directly to a stand-alone personal computer 1122 and a gateway 1124 via preferably standard category 5 ("CAT-5") cabling 1105. Gateway 1124 is in turn coupled to a preferably Ethernet local area network ("LAN") 1125, to which host computer 1126 and handheld computer device 1128 are both coupled. Sensor 1102, which is operative to execute software or firmware embodying algorithm 500, transmits information and data either automatically or as requested by a user that may include the sensor's current settings and operational status and the associated lamp's status including, for example, remaining lamp life, as tracked by the sensor and calculated by algorithm 500. Occupancy sensor 1102 may be programmed by, and may have information/data transmitted from it displayed by and/or stored in personal computer 1122, gateway 1124, host computer 1126, and/or handheld computer device 1128.

Figure 12:
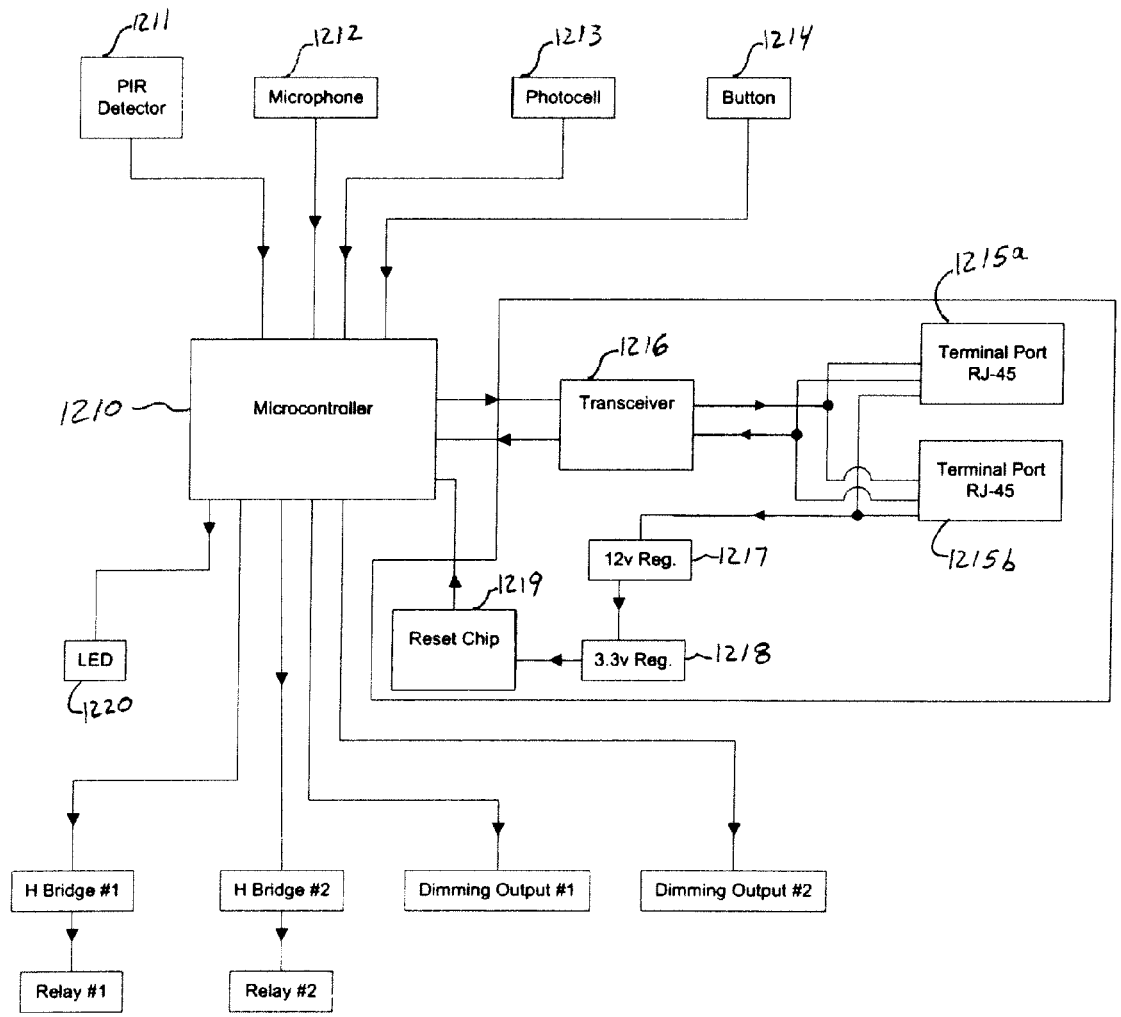
FIG. 12 is a block diagram of an exemplary embodiment of a networked occupancy sensor that can be used in the system of FIG. 11 according to the invention.

FIG. 12 shows a hardware embodiment of networked occupancy sensor 1102 in accordance with the invention. Occupancy sensor 1102 includes integrated microcontroller 1210, PIR detector 1211, optional sound detector (microphone) 1212, optional daylight detector (photocell) 1213, programmable push button 1214, connector ports 1215a and 1215b, transceiver 1216, voltage regulators 1217 and 1218, reset chip 1219, LED 1220, H-bridge #1, optional H-bridge #2, relay #1, optional relay #2, and optional dimming outputs #1 and #2 (for use with dimmable lighting ballasts and daylight detector 1213). Occupancy sensor 1102 can be programmed to operate with either PIR detection or both PIR and sound detection. (The PIR and sound detection technology may be the same as that disclosed in, for example, U.S. Pat. No. 5,701,117). Reset chip 1219 monitors the preferably 3.3 volts from regulator 1218 and disables the microcontroller via a reset pin if the voltage falls below a set level, such as, for example, 2.8 volts. This prevents the microcontroller from possibly malfunctioning or locking up should its input voltage drop below a certain level. The H-bridges allow the sensors to throw the relays in either direction. That is, the H-bridges are circuits that allow current to pass in either direction (i.e., either polarity) through the relay coil to allow the rely to switch in either direction. Microcontroller 1210, which is operative to execute software and/or firmware, is preferably a Texas Instruments MSP430F2272, transceiver 1216 is preferably an RS-485 Analog Devices ADM3493, and reset chip 1219 is preferably a TelCom Semiconductor TC54VN27 voltage detector. Occupancy sensor 1102 may be a line voltage sensor (having at least one relay) coupled directly to lighting units or a low voltage sensor (having neither relay #1 nor relay #2) coupled to a power supply/relay device, which is coupled to lighting units.

As with occupancy sensors 102 and 302, the invention can include other types of networked occupancy sensors having different sensing capabilities in order to provide occupancy detection for rooms and areas having a wide variety of characteristics and configurations. The different types include ceiling mounted extended range 360° sensors for placement in large rooms or areas; high bay 360° sensors for placement in areas with high ceilings such as warehouses and gymnasiums; corner or ceiling mounted wide view sensors for placement in areas such as classrooms; and wall or ceiling mounted hallway sensors for placement in long narrow areas such as hallways or corridors. U.S. Pat. Nos. 6,215,398 and 6,304,180 each disclose occupancy sensing technologies that may be used in networked occupancy sensors of the invention. All networked occupancy sensors of the invention have integrated microcontrollers and firmware and the ability to communicate either directly or via a network to a display device, and can be programmed either locally via a push button on the sensor or remotely via other computer processing devices. Occupancy sensors of the invention may be connected to other devices such as power packs, wall units, and daylight sensors using preferably CAT-5 cabling, and may operate with low voltage or line voltage. Low voltage sensors do not have a relay and thus communicate with relays located elsewhere within the lighting control zone. Multiple occupancy sensors can be used in the same zone to provide coverage for oddly shaped rooms or large open areas. Note that the various embodiments of occupancy sensors that can be used with the invention may not have all of the sensing and output components shown in FIG. 12. For example, some sensors may not have relays or only one relay. Other sensors may not have dimming outputs or only one dimming output. While still other sensors may not have daylight detector (photocell) 1213, PIR detector 1211, or sound detector (microphone) 1212.

Networked occupancy sensor 1102 may be part of an independent locally-operated lighting control zone coupled directly to a stand-alone computer and/or one or more other devices having processing and/or display capabilities. Alternatively, occupancy sensor 1102 may be part of a lighting control system 1100 as shown in FIG. 11. Lighting control system 1100 has three main components: devices, lighting control zones, and a network backbone. Devices include, for example, occupancy sensors, daylight sensors, power supply/relay units, and wall switch units. Each device has the ability to communicate over the network backbone and preferably has an integrated microcontroller and firmware and RJ-45 style connector ports. The lighting control system may be controlled via host computer 1126 executing Web-based control software. The lighting control system may also be controlled via a gateway (e.g., gateway 1124, discussed in more detail below) or a laptop or other computer, workstation, or handheld device (e.g., handheld computer device 1128) that can remotely access the Web-based control software. Device and communication power may be delivered via CAT-5 cabling connected to a device's RJ-45 connector port, or may be connected directly from a power supply to a device's power terminal connector, if so equipped.

Gateway 1124 is part of the network backbone of lighting control system 1100. Gateway 1124 transports and routes information between multiple lighting control zones (not shown) and the Web-based control software. Gateway 1124 interconnects multiple lighting control zones preferably using CAT-5 cabling and communicates over LAN 1125 using standard Ethernet and TCP/IP communication protocols. Gateway 1124 is preferably a 2-gang low voltage wall unit that mounts to a 2-gang junction box, and has a LAN connector port and several preferably RJ-45 connector ports for connection to downstream lighting control zones via CAT-5 cabling. Gateway 1124 acts both as a communication access point for the system's control software and as a local control device for accessing any downstream device including, for example, occupancy sensor 1102. Gateway 1124 has a display screen 1127, which is preferably a backlit LCD (liquid crystal display) screen, and control keys 1129, which may be conventional keypad devices. Using the display screen and control keys, users can request and display various lamp life data and statistics and occupancy sensor settings and status.

Figure 13:
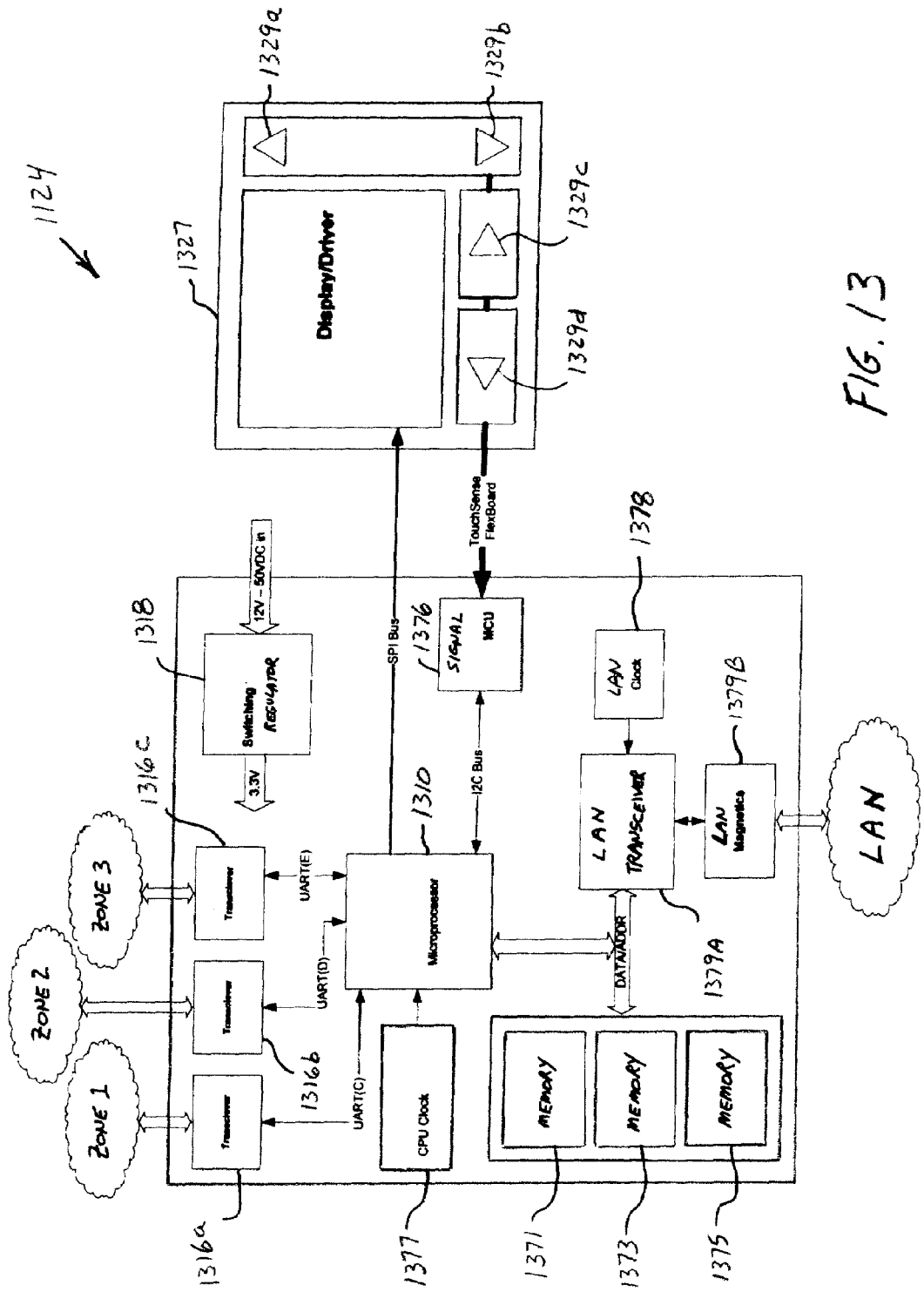
FIG. 13 is a block diagram of an exemplary embodiment of a gateway according to the invention.

FIG. 13 shows a hardware embodiment of gateway 1124 that can be used to execute software or firmware embodying algorithm 500 and/or that can store lamp and occupancy related information/data downloaded from networked occupancy sensor 1102 in accordance with the invention. Gateway 1124 includes a microprocessor 1310, a memory board containing memory devices 1371, 1373, and 1375, signal microcontroller 1376, CPU clock 1377, LAN clock 1378, LAN transceiver 1379A,B, three transceivers 1316a-c, switching voltage regulator 1318, and display/driver 1323. Microprocessor 1310 is preferably an 8-bit Rabbit 3000 microprocessor from Rabbit Semiconductor. Microprocessor 1310 is operative to execute software or firmware embodying algorithm 500 and preferably has hardware and/or software support for TCP/IP, IrDA, SDLC/HDLC, Async, SPI, and I2C; 56+ digital I/O; and six serial ports. The application code executed by the microprocessor comprises API calls and hardware drivers to implement most TCP/IP protocols. Memory device 1371 is preferably a 512 KB flash memory used to store the application code and gateway configuration block parameters. Memory device 1373 is preferably a 512 KB FSRAM (fast static random access memory) used by the application code and stack software for variables and communication buffers. And memory device 1375 is preferably a 512 KB SRAM (static random access memory) used to store information and data received from occupancy sensor 1102 and lighting control information for the lighting control zones connected to the gateway. CPU clock 1377 includes a main CPU oscillator and a real-time clock oscillator. LAN clock 1378 is preferably an Ethernet driver oscillator. These clocks are each individual circuits that provide each module with their respective operational frequency. LAN transceiver 1379A,B is preferably a 10/100 Ethernet MAC/PHY (media access control/physical layer) driver and associated magnetics, respectively. Transceivers 1316a-c are preferably EIA 485 transceivers coupled respectively to preferably RJ-45 connector ports. Using three UARTs (universal asynchronous receiver/transmitters) from microprocessor 1310, the gateway can interface with occupancy sensor 1102 and other lighting control zones connected to the three connector ports. Switching regulator 1318 is a DC/DC step-down switching regulator, and display/driver 1327 is an LCD (liquid crystal display) driver display that may be implemented using Desintron F-STN positive display DV5520BB (132 W×64 H pixels). Display/driver 1327 includes four control keys: up 1329a, down 1329b, right (enter) 1329c, and left (escape) 1329d. Microprocessor 1310 checks for any key presses and then performs and displays the respective action on display screen 1127.

U.S. patent application Ser. No. 12/116,185, which discloses a lighting control system that includes occupancy sensors, gateways, an Ethernet LAN network, lighting control software, and other components and features that may be used with the invention, is incorporated herein by reference.

FIG. 14 shows an example of a screen display of lamp life status that may be displayed on any one of, for example, personal computer 1122, gateway 1124, host computer 1126, and/or handheld computer device 1128 in accordance with the invention. Display 1400 lists the remaining lamp life of lamps located in four lighting control zones of a lighting control system. An occupancy sensor of the invention located in each of the four lighting control zones executes software or firmware embodying algorithm 500. Algorithm 500 calculates the loss of lamp life for the lamps in each of the four lighting control zones based on the type of lamp/ballast combinations used and the particular occupancy patterns sensed in those lighting control zones. The calculated losses, which may be converted to percentage of lamp life remaining, are transmitted by the four occupancy sensors to preferably a gateway, such as gateway 1124, or other computer processing device that can format the received data for display either on its own display screen and/or on another display device as requested by a user. The invention advantageously permits, for example, a building manager to review the status of lamps and then take appropriate action as needed. As shown in FIG. 14, the lamps in zone 1 still have more than half their lamp life remaining, as do the lamps of zones 3 and 4. However, the lamps of zone 2 are near their end-of-life and should soon be replaced. An optional audible alert may accompany the display of zone 2's lamp life status. The building manager can now assign maintenance personnel to replace the lamps in zone 2 before they burn out, thus avoiding any inconvenience or dangerous and/or hazardous conditions that could result from burnt out lamps.

Other information and data related to lamp usage and sensor operation can also be displayed in accordance with the invention. For example, the graphs of FIGS. 7-10 can be displayed to permit a user to review the data calculated by algorithm 500. Also, the current number of off/on transitions, total lamp on time, lamp loss per simulated and actual delay times, settings of various delay times, and values of various sensor timers can also be requested by a user and displayed on a display device.

The software or firmware embodying algorithm 500 is not limited to being executed by an occupancy sensor of the invention. Alternatively, such software or firmware can be executed by other devices having a microcontroller, microprocessor, or computer processor of sufficient processing capability and memory capacity coupled to an occupancy sensor of the invention. In these cases, the occupancy sensor transmits data pertaining to occupancy, time delay status, and lamp status to the device executing the software or firmware embodying algorithm 500. For example, any one of local computer 1122, gateway 1124, host computer 1126, and/or handheld computer device 1128 could execute software or firmware embodying algorithm 500, provided they have sufficient processing capability and memory capacity.

Also, data gathered and/or calculated by algorithm 500 and its associated occupancy sensor, such as lamp loss, the total number of off/on transitions, the total on time of a lamp, optimal time delay setting, etc., is not limited to being stored in the associated occupancy sensor, but can be alternatively downloaded and stored remotely in, for example, any one of local computer 1122, gateway 1124, host computer 1126, handheld computer device 1128, and/or other remotely-connected computers, provided sufficient memory capacity exists in the device.

In an alternative embodiment of the invention, an occupancy sensor controls the on/off state of a lamp and tracks the number of off/on transitions and the amount of time the lamp is on for a lamp it is controlling. The sensor includes a first timer set to a first time delay that is operative to activate upon the sensor detecting vacancy after occupancy had been detected and to deactivate upon expiration of the first time delay, the first timer operative to prevent the sensor from turning off the lamp upon activation of the first timer and for the duration of the first time delay. The sensor also includes a counter operative to count the number of times the lamp turns on (i.e., the off/on transitions), a second timer operative to activate upon the lamp turning on and deactivate upon the lamp turning off, and a register operative to store a cumulative amount of time the lamp is on as tracked by the second timer. This information can then be used to later calculate lamp life and energy usage of the lamp either at the sensor itself if equipped with appropriate processing means (e.g., a microcontroller executing appropriate firmware and/or software) or remotely at a gateway or computer executing appropriate firmware and/or software. The tracked and calculated data can be provided to a user via the push button and LED of the sensor, a display on the sensor, or a display device coupled to the sensor and/or the gateway or computer.

In another alternative embodiment of the invention, an occupancy sensor concurrently calculates the number of times a lamp would turn on (i.e., off/on transitions) and the amount of time a lamp would be on for each of a selectable number of time delays to which the sensor could be programmed. That is, algorithm 500 is used to concurrently simulate the effect of each selectable time delay on the number of starts (i.e., off/on transitions) and the amount of lamp on time as if the sensor's "last detected occupancy" timer were respectively programmed to these time delays. The result is an estimate of the number of starts and the amount of lamp on time the lamp would experience for each of the selectable time delays. This information can then be used to calculate lamp life and energy usage for each of the selectable time delays. The simulated and calculated data can be fed back to a user via the push button and LED of the sensor, a display on the sensor, or a display device coupled to the sensor. This data can also be used by the sensor to automatically determine an optimal time delay for the "last detected occupancy" timer In yet another alternative embodiment of the invention, an occupancy sensor not controlling the on/off operation of a lamp in a lighting control zone monitored by the sensor can still be used to determine an optimal time delay setting for the "last detected occupancy" timer and to estimate loss of lamp life and/or energy usage of that lamp based on an observed occupancy sensor pattern in that lighting control zone.

The invention is also not limited to use with fluorescent lamps, but can be used alternatively with other types of lamps provided that appropriate lamp loss equations and lamp life data are available.

Thus it is seen that occupancy sensors that measure lamp loss are provided. One skilled in the art will appreciate that the invention can be practiced by other than the described embodiments, which are presented for purposes of illustration and not of limitation, and the invention is limited only by the following claims.

We claim:

1. An occupancy sensor that controls the on/off state of a lamp, the sensor comprising:

a first timer set to a first time delay, the first timer operative to activate upon the sensor detecting vacancy after occupancy had been detected and to deactivate upon expiration of the first time delay, the first timer operative to prevent the sensor from turning off the lamp upon activation of the first timer and for the duration of the first time delay;

a counter operative to count the number of times the lamp turns on;

a second timer operative to activate upon the lamp turning on and deactivate upon the lamp turning off; and a register operative to store a cumulative amount of time the lamp is on as timed by the second timer.

2. The sensor of claim 1 wherein the lamp is a fluorescent lamp.

3. The sensor of claim 1 further comprising a push button and a light emitting diode wherein, in response to actuation of the push button, the sensor is operative to communicate via activation of the light emitting diode at least one of the cumulative amount of time the lamp is on or the number of times the lamp turns on.

4. The sensor of claim 1 further comprising a push button wherein, in response to actuation of the push button, the sensor is operative to clear stored data in the counter or the register pertaining to at least one of the cumulative amount of time the lamp is on or the number of times the lamp turns on.

5. The sensor of claim 1 further comprising a microcontroller operative to execute firmware or software that calculates at least one of a loss of lamp life or energy used by the lamp based on the number of times the lamp is turned on and the cumulative amount of time the lamp is on.

6. The sensor of claim 5 wherein the microcontroller is operative to store data pertaining to at least one of the loss of lamp life or the energy used by the lamp.

7. The sensor of claim 6 further comprising a push button and a light emitting diode wherein, in response to actuation of the push button, the microcontroller is operative to communicate via activation of the light emitting diode at least one of the loss of lamp life or the energy used by the lamp.

8. The sensor of claim 5 further comprising a display device coupled to the sensor operative to display information pertaining to at least one of the loss of lamp life, the number of times the lamp has turned on, the cumulative amount of time the lamp has been on, and the cumulative energy used by the lamp.

9. The sensor of claim 1 further comprising a third timer set to a third time delay, the third timer operative to activate upon the lamp turning on and deactivate upon expiration of the third time delay, the third timer operative to prevent the sensor from turning off the lamp upon activation of the third timer and for the duration of the third time delay regardless of whether or not occupancy is sensed by the sensor during the duration of the third time delay.

10. A lighting control system for controlling the on/off state of a lamp, the system comprising:
the occupancy sensor of claim 1;
a lighting unit comprising a fluorescent lamp;
a relay coupled to the lighting unit and to a source of line voltage, the relay operative to couple and decouple line voltage to the lighting unit; and
a power supply coupled to a source of line voltage operative to supply power to the occupancy sensor and the relay.

11. The sensor of claim 1 further comprising a passive infrared sensing technology for sensing occupancy.

12. The sensor of claim 1 further comprising an integral relay for connecting and disconnecting power to the lamp.

13. An occupancy sensor that controls the on/off state of a lamp, the sensor comprising:
a first timer set to a first time delay, the first timer operative to activate upon the sensor detecting vacancy after occupancy had been detected and to deactivate upon expiration of the first time delay, the first timer operative to prevent the sensor from turning off the lamp upon activation of the first timer and for the duration of the first time delay; and
a microcontroller operative to execute firmware or software that simulates an effect of each of a plurality of selectable first time delays on the operation of the lamp by the sensor and determines the number of times the lamp would turn on and the cumulative amount of time the lamp would be on for each of the plurality of selectable first time delays.

14. The sensor of claim 13 wherein the microcontroller is operative to store data pertaining to at least one of the cumulative amount of time the lamp would be on or the number of times the lamp would turn on for each of the plurality of selectable first time delays.

15. The sensor of claim 14 further comprising a push button and a light emitting diode wherein, in response to actuation of the push button, the microcontroller is operative to communicate via activation of the light emitting diode at least one of the cumulative amount of time the lamp would be on or the number of times the lamp would turn on for any one of the plurality of selectable first time delays.

16. The sensor of claim 14 further comprising a push button wherein, in response to actuation of the push button, the microcontroller is operative to clear stored data pertaining to at least one of the cumulative amount of time the lamp would be on or the number of times the lamp would turn on for any one of the plurality of selectable first time delays.

17. The sensor of claim 14 wherein the microcontroller is operative to execute firmware or software that calculates at least one of the loss of lamp life or the energy used by the lamp based on the number of times the lamp would turn on and the cumulative amount of time the lamp would be on for each of the plurality of selectable first time delays.

18. The sensor of claim 17 further comprising a display device coupled to the sensor operative to display information for any one of the plurality of selectable first time delays pertaining to at least one of the loss of lamp life, the number of times the lamp would turn on, the cumulative amount of time the lamp would be on, the cumulative energy used by the lamp, and the selected time delay.

19. The sensor of claim 17 wherein the microcontroller is operative to store data pertaining to at least one of the loss of lamp life or the energy used by the lamp for each of the plurality of selectable first time delays.

20. The sensor of claim 19 further comprising a push button and a light emitting diode wherein, in response to actuation of the push button, the microcontroller is operative to communicate via activation of the light emitting diode at least one of the loss of lamp life or the energy used by the lamp for any one of the plurality of selectable first time delays.

21. The sensor of claim 19 wherein the microcontroller is operative to select a time delay from among the plurality of selectable first time delays based on at least one of the loss of lamp life or the energy used by the lamp for each of the plurality of selectable first time delays.

22. The sensor of claim 21 wherein the time delay selected by the microcontroller is limited to a minimum and maximum value programmable by a user.

23. The sensor of claim 21 wherein the first timer is automatically set by the microcontroller to the time delay selected by the microcontroller.

24. The sensor of claim 21 wherein after the time delay is selected by the microcontroller, the data pertaining to at least one of the loss of lamp life or the energy used by the lamp is cleared.

25. The sensor of claim 21 wherein after the time delay is selected by the microcontroller, the data pertaining to at least one of the loss of lamp life or the energy used by the lamp is maintained and used in subsequent selections of a time delay by the microcontroller.

26. The sensor of claim 13 further comprising a second timer set to a second time delay, the second timer operative to activate upon the lamp turning on and deactivate upon expiration of the second time delay, the second timer operative to prevent the sensor from turning off the lamp upon activation of the second timer and for the duration of the second time delay regardless of whether or not occupancy is sensed by the sensor during the duration of the second time delay.

27. A lighting control system for controlling the on/off state of a lamp, the system comprising:
the occupancy sensor of claim 13;
a lighting unit comprising a fluorescent lamp;

a relay coupled to the lighting unit and to a source of line voltage, the relay operative to couple and decouple line voltage to the lighting unit; and a power supply coupled to a source of line voltage operative to supply power to the occupancy sensor and the relay.

28. The sensor of claim 13 further comprising a passive infrared sensing technology for sensing occupancy.

29. The sensor of claim 13 further comprising an integral relay for connecting and disconnecting power to the lamp.

30. An occupancy sensor that controls the on/off state of a lamp, the sensor comprising:

a first timer set to a first time delay, the first timer operative to activate upon the sensor detecting vacancy after occupancy had been detected and to deactivate upon expiration of the first time delay, the first timer operative to prevent the sensor from turning off the lamp upon activation of the first timer and for the duration of the first time delay; and a microcontroller operative to execute firmware or software that calculates in real time at least one of a loss of lamp life or energy used by the lamp based on actual operation of the lamp as controlled by the sensor.

31. The sensor of claim 30 wherein the microcontroller is operative to store data pertaining to at least one of the loss of lamp life or the energy used by the lamp.

32. The sensor of claim 31 further comprising a push button and a light emitting diode wherein, in response to actuation of the push button, the microcontroller is operative to communicate via activation of the light emitting diode at least one of the loss of lamp life or the energy used by the lamp.

33. The sensor of claim 31 further comprising a push button wherein, in response to actuation of the push button, the microcontroller is operative to clear stored data pertaining to at least one of the loss of lamp life or the energy used by the lamp.

34. The sensor of claim 30 further comprising a second timer set to a second time delay, the second timer operative to activate upon the lamp turning on and deactivate upon expiration of the second time delay, the second timer operative to prevent the sensor from turning off the lamp upon activation of the second timer and for the duration of the second time delay regardless of whether or not occupancy is sensed by the sensor during the duration of the second time delay.

35. A lighting control system for controlling the on/off state of a lamp, the system comprising:

the occupancy sensor of claim 30;
a lighting unit comprising a fluorescent lamp;
a relay coupled to the lighting unit and to a source of line voltage, the relay operative to couple and decouple line voltage to the lighting unit; and
a power supply coupled to a source of line voltage operative to supply power to the occupancy sensor and the relay.

36. The sensor of claim 30 further comprising a passive infrared sensing technology for sensing occupancy.

37. The sensor of claim 30 further comprising an integral relay for connecting and disconnecting power to the lamp.

38. The sensor of claim 30 further comprising a display device coupled to the sensor operative to display information pertaining to at least one of the loss of lamp life or the energy used by the lamp.

39. An occupancy sensor that controls the on/off state of a lamp, the sensor comprising:

a first timer set to a first time delay, the first timer operative to activate upon the sensor detecting vacancy after occupancy had been detected and to deactivate upon expiration of the first time delay, the first timer operative to prevent the sensor from turning off the lamp upon activation of the first timer and for the duration of the first time delay; and a microcontroller operative to execute firmware or software that calculates in real time at least one of a loss of lamp life or energy used by the lamp based on a simulated operation of the lamp as controlled by the sensor for each of a plurality of selectable first time delays.

40. The sensor of claim 39 wherein the microcontroller is operative to store data pertaining to at least one of the loss of lamp life or the energy used by the lamp for each of the plurality of selectable first time delays.

41. The sensor of claim 39 further comprising a push button and a light emitting diode wherein, in response to actuation of the push button, the microcontroller is operative to communicate via activation of the light emitting diode at least one of the loss of lamp life or the energy used by the lamp for any one of the plurality of selectable first time delays.

42. The sensor of claim 39 further comprising a push button wherein, in response to actuation of the push button, the microcontroller is operative to clear stored data pertaining to at least one of the loss of lamp life or the energy used by the lamp for any one of the plurality of selectable first time delays.

43. The sensor of claim 39 wherein the microcontroller is operative to select a time delay from among the plurality of selectable first time delays based on at least one of the loss of lamp life or the energy used by the lamp.

44. The sensor of claim 43 wherein the time delay selected by the microcontroller is limited to a minimum and maximum value programmable by a user.

45. The sensor of claim 43 wherein the first timer is automatically set by the microcontroller to the time delay selected by the microcontroller.

46. The sensor of claim 43 wherein after the time delay is selected by the microcontroller, the data pertaining to at least one of the loss of lamp life or the energy used by the lamp is cleared.

47. The sensor of claim 43 wherein after the time delay is selected by the microcontroller, the data pertaining to at least one of the loss of lamp life or the energy used by the lamp is maintained and used in subsequent selections of a time delay by the microcontroller.

48. The sensor of claim 39 further comprising a second timer set to a second time delay, the second timer operative to activate upon the lamp turning on and deactivate upon expiration of the second time delay, the second timer operative to prevent the sensor from turning off the lamp upon activation of the second timer and for the duration of the second time delay regardless of whether or not occupancy is sensed by the sensor during the duration of the second time delay.

49. A lighting control system for controlling the on/off state of a lamp, the system comprising:

the occupancy sensor of claim 39;
a lighting unit comprising a fluorescent lamp;
a relay coupled to the lighting unit and to a source of line voltage, the relay operative to couple and decouple line voltage to the lighting unit; and
a power supply coupled to a source of line voltage operative to supply power to the occupancy sensor and the relay.

50. The sensor of claim 39 further comprising a passive infrared sensing technology for sensing occupancy.

51. The sensor of claim 39 further comprising an integral relay for connecting and disconnecting power to the lamp.

52. The sensor of claim 39 further comprising a display device coupled to the sensor operative to display information for any one of the plurality of selectable first time delays pertaining to at least one of the loss of lamp life, the energy used by the lamp, or the selected first time delay.

53. A method of using an occupancy sensor to automatically determine at least one of the loss of lamp life or amount of energy used by a lamp whose on/off state is controlled by the occupancy sensor, the method comprising:
 (a) the sensor sensing occupancy and causing the lamp to turn on;
 (b) the sensor determining a first loss of lamp life caused by the lamp turning on;
 (c) the sensor sensing no occupancy;
 (d) the sensor activating a timer in response to sensing no occupancy, the timer set to a first time delay;
 (e) the sensor causing the lamp to turn off upon expiration of the first time delay and no occupancy being sensed during the first time delay; and
 (f) the sensor determining a second loss of lamp life caused by the lamp being on; and
 (g) the sensor summing the first and second losses of lamp life to determine a total loss of lamp life.

54. The method of claim 53 further comprising:
 repeating (a) through (g) at least once; and
 the sensor summing the total loss of lamp life with the previously determined total loss of lamp life to determine a cumulative loss of lamp life.

55. The method of claim 54 further comprising communicating the cumulative loss of lamp life to a user via a display device or via activation of a light emitting diode of the occupancy sensor in response to actuation of a push button of the occupancy sensor.

56. The method of claim 53 further comprising:
 the sensor simulating (a) through (g) concurrently for a plurality of selectable first time delays as if the timer were respectively set to each of the selectable first time delays;
 repeating the simulating of (a) through (g) at least once; and
 the sensor summing the total loss of lamp life with the previously determined total loss of lamp life to determine a cumulative loss of lamp life for each of the plurality of selectable first time delays.

57. The method of claim 56 further comprising the sensor automatically selecting a time delay having the lowest cumulative loss of lamp life from among the plurality of selectable first time delays.

58. The method of claim 57 further comprising the sensor automatically setting the timer to the selected first time delay.

59. The method of claim 53 further comprising the sensor determining the energy used by the lamp being on.

60. The method of claim 59 further comprising the sensor calculating the cost of the energy used by the lamp being on and converting the cost to an equivalent loss of lamp life.

61. The method of claim 59 further comprising:
 repeating at least once (a) through (g) and the sensor determining the energy used by the lamp being on; and
 the sensor summing at least one of the total loss of lamp life with the previously determined total loss of lamp life to determine a cumulative loss of lamp life or the energy used by the lamp with the previously determined energy used to determine a cumulative amount of energy used by the lamp.

62. The method of claim 61 further comprising communicating at least one of the cumulative loss of lamp life or cumulative amount of energy used to a user via a display device or via activation of a light emitting diode of the occupancy sensor in response to actuation of a push button of the occupancy sensor.

63. The method of claim 59 further comprising:
 the sensor simulating (a) through (g) and the determining of energy used for each of a plurality of selectable first time delays as if the timer were respectively set to each of the selectable first time delays;
 repeating at least once the simulating of (a) through (g) and the determining of energy used for each of a plurality of selectable first time delays; and
 the sensor summing at least one of:
  the total loss of lamp life with the previously determined total loss of lamp life to determine a cumulative loss of lamp life for each of the plurality of selectable first time delays, or
  the energy used by the lamp with the previously determined energy used by the lamp to determine a cumulative amount of energy used by the lamp for each of the plurality of selectable first time delays.

64. The method of claim 63 further comprising the sensor calculating the cost of the cumulative amount of energy used by the lamp and converting the cost to an equivalent loss of lamp life for each of the plurality of selectable time delays.

65. The method of claim 64 further comprising selecting a time delay having the lowest total loss combination of the cumulative loss of lamp life and equivalent loss of lamp life from energy usage from among the plurality of selectable first time delays.

66. The method of claim 65 further comprising the sensor automatically setting the timer to the selected first time delay.

67. A method of controlling the on/off state of a lamp with an occupancy sensor to extend lamp life of the lamp, the method comprising:
 preventing the sensor from turning off the lamp upon activation of a first timer and for the duration of a first time delay regardless of whether or not occupancy is sensed by the sensor during the duration of the first time delay, the first timer set to the first time delay, the first timer operative to activate upon the lamp turning on and to deactivate upon expiration of the first time delay; and
 preventing the sensor from turning off the lamp upon activation of a second timer and for the duration of a second time delay, the second timer automatically programmed by the sensor to the second time delay, the second timer operative to activate upon the sensor first detecting vacancy after occupancy had been detected and to deactivate upon expiration of the second time delay or the sensor sensing occupancy, whichever occurs first.

68. The method of claim 67 further comprising preventing the sensor from turning off the lamp upon activation of the second timer and for duration of the longer of the second time delay or a third time delay, the third time delay measured from the activation of the second timer.

69. The method of claim 67 further comprising preventing the sensor from turning off the lamp upon activation of the second timer and for duration of the shorter of the second time delay or a fourth time delay, the fourth time delay measured from the activation of the second timer.

70. The method of claim 67 further comprising:
 activating a third timer upon the lamp turning on; and
 terminating the third timer upon the lamp turning off.

71. The method of claim 70 further comprising tracking the amount of time the lamp is on by using at least one value from the third timer.

72. The method of claim 71 further comprising communicating the amount of time the lamp has been on by activating a light emitting diode of the occupancy sensor in response to actuation of a push button of the occupancy sensor.

73. The method of claim 67 further comprising executing firmware or software to calculate loss of lamp life based on actual lamp usage as controlled by the sensor.

74. The method of claim 73 further comprising selecting an optimal value from among a plurality of selectable values for the second time delay based on the calculated loss of lamp life.

75. The method of claim 73 further comprising communicating the calculated loss of lamp life by activating a light emitting diode of the occupancy sensor in response to actuation of a push button of the occupancy sensor.

76. The method of claim 67 further comprising counting the number of times the lamp turns on.

77. The method of claim 76 further comprising communicating the number of times the lamp has turned on by activating a light emitting diode of the occupancy sensor in response to actuation of a push button of the occupancy sensor.

78. An occupancy sensor that controls the on/off state of a lamp, the sensor comprising:
   a first timer set to a first time delay, the first timer operative to activate upon the lamp turning on and deactivate upon expiration of the first time delay, the first timer operative to prevent the sensor from turning off the lamp upon activation of the first timer and for the duration of the first time delay regardless of whether or not occupancy is sensed by the sensor during the duration of the first time delay; and
   a second timer set to a second time delay, the second timer operative to activate upon the sensor first detecting vacancy after occupancy had been detected and to deactivate upon expiration of the second time delay or the sensor sensing occupancy, whichever occurs first, the second timer operative to prevent the sensor from turning off the lamp upon activation of the second timer and for the duration of the second time delay.

79. The sensor of claim 78 wherein the second timer is automatically programmable by the sensor to another second time delay.

80. The sensor of claim 78 further comprising a third time delay, the second timer operative to prevent the sensor from turning off the lamp upon activation of the second timer and for the duration of the longer of the second or third time delays, the third time delay measured from the activation of the second timer.

81. The sensor of claim 78 further comprising a fourth time delay, the second timer operative to prevent the sensor from turning off the lamp upon activation of the second timer and for the duration of the shorter of the second or fourth time delays, the fourth time delay measured from the activation of the second timer.

82. The sensor of claim 78 further comprising a third timer operative to activate upon the lamp turning on and to deactivate upon the lamp turning off.

83. The sensor of claim 78 further comprising a microcontroller operative to execute firmware or software that calculates loss of lamp life based on actual lamp usage as controlled by the sensor.

84. The sensor of claim 83 wherein the microcontroller is operative to select an optimal value from among a plurality of selectable values for the second time delay based on the calculated loss of lamp life.

85. The sensor of claim 83 further comprising a pushbutton and a light emitting diode and wherein the microcontroller is operative to communicate the calculated loss of lamp life via activation of the light emitting diode in response to actuation of the push button.

86. The sensor of claim 83 further comprising a pushbutton and a light emitting diode and wherein the microcontroller is operative to count the number of times the lamp turns on and to communicate the number of times the lamp has turned on via activation of the light emitting diode in response to actuation of the push button.

87. The sensor of claim 83 further comprising a pushbutton and a light emitting diode and wherein the microcontroller is operative to track the amount of time the lamp is on and to communicate the amount of time the lamp has been on via activation of the light emitting diode in response to actuation of the push button.

88. The sensor of claim 83 further comprising a pushbutton and a light emitting diode and wherein the microcontroller is operative to (1) count the number of times the lamp turns on, (2) track the amount of time the lamp is on, and (3) store data pertaining to at least one of the amount of time the lamp is on, the number of times the lamp turns on, or the calculated loss of lamp life, the microcontroller further operative to clear stored data in response to actuation of the push button.

89. A method of controlling the on/off state of a fluorescent lamp with an occupancy sensor to extend lamp life of the lamp, the method comprising:
   the sensor turning on the fluorescent lamp in response to detecting occupancy;
   the sensor keeping the fluorescent lamp on for a first period of time in response to first detecting vacancy after detecting occupancy;
   the sensor turning off the fluorescent lamp in response to detecting vacancy for longer than the first period of time; and
   the sensor automatically selecting a selectable value for the first period of time based on (1) the sensor turning the fluorescent lamp on and off over a second period of time and (2) the sensor simulating the effects of the lamp turning on and off over the second period of time using a plurality of selectable values for the first period of time.

90. The method of claim 89 wherein the second period of time is about two weeks.

91. A method of controlling the on/off state of a fluorescent lamp with an occupancy sensor to extend lamp life of the lamp, the method comprising:
   the sensor turning on the fluorescent lamp in response to detecting occupancy;
   the sensor keeping the fluorescent lamp on for a first period of time in response to first detecting vacancy after detecting occupancy;
   the sensor turning off the fluorescent lamp in response to detecting vacancy for longer than the first period of time; and
   in response to the sensor turning on the fluorescent lamp, the sensor keeping the fluorescent lamp on for a third period of time regardless of the length of the first period of time.

92. A method of controlling the on/off state of a fluorescent lamp with an occupancy sensor to extend lamp life of the lamp, the method comprising:
   the sensor turning on the fluorescent lamp in response to detecting occupancy;
   the sensor keeping the fluorescent lamp on for a first period of time in response to first detecting vacancy after detecting occupancy;

the sensor turning off the fluorescent lamp in response to detecting vacancy for longer than the first period of time; and the sensor automatically calculating a loss of lamp life based on the sensor turning the fluorescent lamp on and off over a second period of time.

93. The method of claim 92 further comprising the sensor automatically selecting a value for the first period of time from among a plurality of selectable values available in the occupancy sensor in response to the sensor calculating the loss of lamp life.

94. The method of claim 92 further comprising the sensor communicating the loss of lamp life to a user in response to an inquiry from the user.

95. A method of using an occupancy sensor to automatically determine the amount of time a lamp is on, the on/off state of the lamp controlled by the occupancy sensor, the method comprising:
  (a) the sensor sensing occupancy and causing the lamp to turn on;
  (b) the sensor activating a first timer in response to the lamp turning on;
  (c) the sensor sensing no occupancy;
  (d) the sensor activating a second timer in response to sensing no occupancy, the second timer set to a first time delay;
  (e) the sensor causing the lamp to turn off and the second timer to deactivate upon expiration of the first time delay and no occupancy being sensed during the first time delay;
  (f) the sensor deactivating the first timer in response to the lamp turning off; and
  (g) the sensor determining the amount of time the lamp is on using a value in the first timer.

96. The method of claim 95 further comprising:
repeating (a) through (g) at least once;
the sensor summing the amount of time the lamp is on with the previously determined amount of time the lamp is on to determine a cumulative amount of time the lamp is on; and
the sensor incrementing a counter each time (a) is repeated to determine a cumulative number of starts.

97. The method of claim 96 further comprising communicating to a user at least one of the cumulative amount of time the lamp is on or the cumulative number of starts via a display device or via activation of a light emitting diode of the occupancy sensor.

98. The method of claim 96 further comprising transmitting to a gateway or computer at least one of the amount of time the lamp is on, the cumulative amount of time the lamp is on, or the cumulative number of starts.

99. The method of claim 98 further comprising the gateway or computer calculating a loss of lamp life or energy used by the lamp based on at least one of the amount of time the lamp is on, the cumulative amount of time the lamp is on, or the cumulative number of starts.

100. The method of claim 95 further comprising:
a gateway or computer coupled to the sensor simulating (a) through (g) concurrently for a plurality of selectable time delays as if the second timer were respectively set to each of the selectable time delays;
the gateway or computer repeating the simulating of (a) through (g) at least once; and
the gateway or computer summing the total amount of time the lamp would have been on with the previously determined total amount of time the lamp would have been on to determine a cumulative amount of time the lamp would have been on for each of the plurality of selectable time delays; and
the gateway or computer incrementing a counter for each time (a) is simulated to determine a cumulative number of starts for each of the plurality of selectable time delays.

101. The method of claim 100 further comprising:
the gateway or computer calculating a cumulative loss of lamp life for each of the plurality of selectable time delays based on the cumulative amount of time the lamp would have been on and the cumulative number of starts for each of the plurality of selectable time delays;
the gateway or computer automatically selecting a time delay having the lowest cumulative loss of lamp life from among the plurality of selectable time delays; and
the gateway or computer automatically setting the second timer to the selected time delay.

102. The method of claim 95 further comprising:
the sensor simulating (a) through (g) concurrently for a plurality of selectable time delays as if the second timer were respectively set to each of the selectable time delays;
the sensor repeating the simulating of (a) through (g) at least once; and
the sensor summing the total amount of time the lamp would have been on with the previously determined total amount of time the lamp would have been on to determine a cumulative amount of time the lamp would have been on for each of the plurality of selectable time delays; and
the sensor incrementing a counter for each time (a) is simulated to determine a cumulative number of starts for each of the plurality of selectable time delays.

103. The method of claim 102 further comprising the sensor calculating a cumulative loss of lamp life for each of the plurality of selectable time delays based on the cumulative amount of time the lamp would have been on and the cumulative number of starts for each of the plurality of selectable time delays.

104. The method of claim 103 further comprising the sensor automatically selecting a time delay having the lowest cumulative loss of lamp life from among the plurality of selectable time delays.

105. The method of claim 104 further comprising the sensor automatically setting the second timer to the selected time delay.

106. A lighting control system for controlling the on/off state of a lamp, the system comprising:
an occupancy sensor comprising:
  a counter operative to count the number of times the lamp turns on;
  a first timer operative to activate upon the lamp turning on and deactivate upon the lamp turning off;
  a register operative to store a cumulative amount of time the lamp is on as timed by the first timer; and
  a transceiver operative to transmit data representing the number of times the lamp turns on and the cumulative amount of time the lamp is on;
a lighting unit comprising a fluorescent lamp coupled to either:
  a relay coupled to the occupancy sensor and to a source of line voltage, the relay operative to couple and decouple line voltage to and from the lighting unit; or
  the occupancy sensor, the occupancy sensor further comprising an integral relay, the integral relay coupled to a source of line voltage and operative to couple and decouple the line voltage to and from the lighting unit; and a gateway or computer coupled to the occupancy sensor and operative to execute firmware or software that calculates at least one of a loss of lamp life or energy used by the lamp based on data received from the occupancy sensor.

107. The system of claim 106 wherein:

the occupancy sensor further comprises a second timer set to a first time delay, the second timer operative to activate upon the sensor detecting vacancy after occupancy had been detected and to deactivate upon expiration of the first time delay, the second timer operative to prevent the sensor from turning off the lamp upon activation of the second timer and for the duration of the first time delay; and the gateway or computer is further operative to execute firmware or software that automatically sets the second timer to a second time delay that extends lamp life based on at least one of actual or simulated loss of lamp life calculations.

108. The system of claim 106 wherein:

the occupancy sensor further comprises a second timer set to a time delay, the second timer operative to activate upon the sensor detecting vacancy after occupancy had been detected and to deactivate upon expiration of the time delay, the second timer operative to prevent the sensor from turning off the lamp upon activation of the second timer and for the duration of the time delay; and the gateway or computer is further operative to execute firmware or software that simulates an effect of each of a plurality of selectable time delays for the second timer on the operation of the lamp by the sensor and determines the number of times the lamp would turn on and the cumulative amount of time the lamp would be on for each of the plurality of selectable time delays.

109. The system of claim 108 wherein the gateway or computer is operative to calculate a loss of lamp life or energy used by the lamp for each of the plurality of selectable time delays based on the simulated effect of each of the plurality of selectable time delays.

110. The system of claim 109 wherein the gateway or computer is operative to select a time delay from among the plurality of selectable time delays based on at least one of the loss of lamp life or the energy used by the lamp calculated for each of the plurality of selectable time delays.

111. The system of claim 110 wherein the second timer is automatically set by the gateway or computer to the time delay selected by the gateway or computer.

112. The system of claim 106 wherein the computer is a server, a personal computer, a laptop computer, or a handheld computer device.

* * * * *